US007991853B2

(12) United States Patent
Miyoshi et al.

(10) Patent No.: US 7,991,853 B2
(45) Date of Patent: Aug. 2, 2011

(54) INFORMATION PROCESSING SYSTEM, INFORMATION PROCESSING APPARATUS, SERVER APPARATUS, INFORMATION PROCESSING METHOD, AND PROGRAM

(75) Inventors: Toshimasa Miyoshi, Kanagawa (JP); Hideo Nagasaka, Kanagawa (JP); Takashi Tominaga, Tokyo (JP); Tadaaki Kimijima, Tokyo (JP); Shigeru Inoue, Tokyo (JP); Soichiro Atsumi, Shizuoka (JP); Mamoru Tokashiki, Tokyo (JP)

(73) Assignee: Sony Corporation, Tokyo (JP)

( * ) Notice: Subject to any disclaimer, the term of this patent is extended or adjusted under 35 U.S.C. 154(b) by 569 days.

(21) Appl. No.: 12/052,002

(22) Filed: Mar. 20, 2008

(65) Prior Publication Data
US 2008/0256086 A1     Oct. 16, 2008

(30) Foreign Application Priority Data
Apr. 10, 2007   (JP) ................. 2007-102854

(51) Int. Cl.
*G06F 15/16*   (2006.01)
(52) U.S. Cl. ........................ 709/219; 709/229
(58) Field of Classification Search .............. 709/219, 709/229
See application file for complete search history.

(56) References Cited

U.S. PATENT DOCUMENTS

2004/0080777 A1* 4/2004 Smith .................. 358/1.14
2005/0281535 A1* 12/2005 Fu et al. ................ 386/69
2008/0104679 A1* 5/2008 Craig .................... 726/4

FOREIGN PATENT DOCUMENTS
JP        2006-190200        7/2006
* cited by examiner

*Primary Examiner* — Andrew Caldwell
*Assistant Examiner* — Loi Tran
(74) *Attorney, Agent, or Firm* — Oblon, Spivak, McClelland, Maier & Neustadt, L.L.P.

(57) ABSTRACT

An information processing system configured to include at least an open server apparatus and a terminal apparatus communicable with each other through a network is disclosed. The system includes: an opening mode setting means for setting an opening mode; a transmitted content information creating means for creating content information including at least body information and predetermined additional information; a content information storing means for storing content information; a content information upload control means for transmitting content information; and an opening mode determining means for determining an opening mode of the content information stored in the content information storing means.

21 Claims, 25 Drawing Sheets

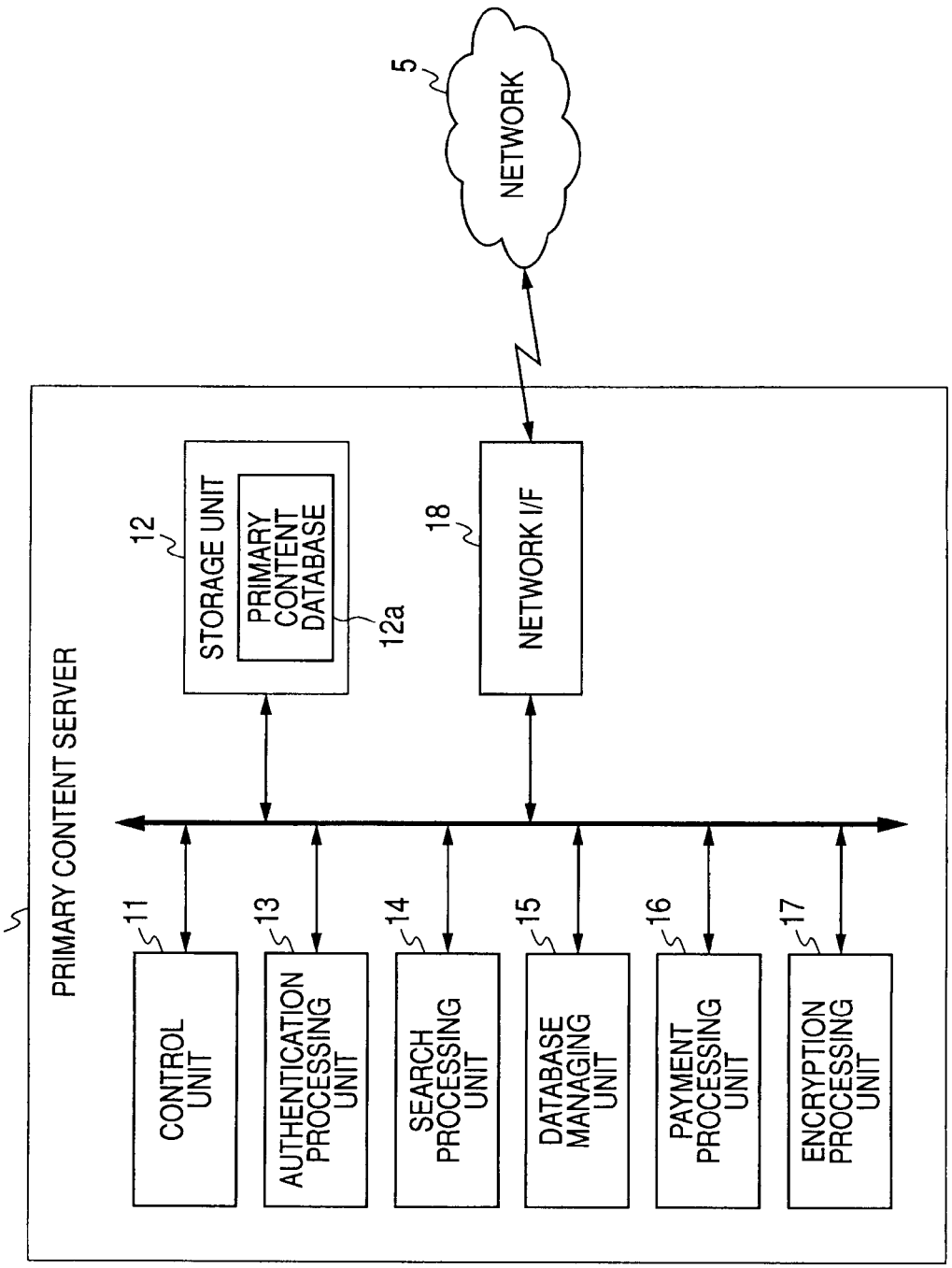

FIG. 13

USED PRIMARY CONTENT INFORMATION/
USED EDITING MATERIAL CONTENT INFORMATION

| | | | |
|---|---|---|---|
| UNIT FILE INFORMATION | FILE ID | | AAAAAA |
| | ARTIST NAME | | - - - - |
| | SONG TITLE | | - - - - |
| | GENERATION | | (1 TO N) |
| | USE PERMISSION RANGE INFORMATION | USE ITEM 1 | PERMITTED |
| | | USE ITEM 2 | NOT PERMITTED |
| | | ⋮ | ⋮ |
| | | USE ITEM 3 | PERMITTED |
| UNIT FILE INFORMATION | FILE ID | | BBBBBB |
| | ARTIST NAME | | - - - - |
| | SONG TITLE | | - - - - |
| | GENERATION | | (1 TO N) |
| | USE PERMISSION RANGE INFORMATION | USE ITEM 1 | PERMITTED |
| | | USE ITEM 2 | ONLY FIRST GENERATION MAY BE PERMITTED |
| | | ⋮ | ⋮ |
| | | USE ITEM 3 | NOT PERMITTED |
| UNIT FILE INFORMATION | FILE ID | | CCCCCC |
| | ARTIST NAME | | - - - - |
| | SONG TITLE | | - - - - |
| | GENERATION | | (1 TO N) |
| | USE PERMISSION RANGE INFORMATION | USE ITEM 1 | NOT PERMITTED |
| | | USE ITEM 2 | PERMITTED |
| | | ⋮ | ⋮ |
| | | USE ITEM 3 | PERMITTED |

REPRODUCTION CONTROL INFORMATION

[
file_id = AAAAAA
time = 00:00 - 00:10
position = vv - zz
]
[
file_id = AAAAAA
time = 00:10 - 00:15
position = ss - tt
]
[
file_id = BBBBBB
time = 00:15 - 00:20
position = pp - uu
]
⋮

FIG. 21A

OPENING INSTRUCTION INFORMATION

| INITIAL OPENING RANGE |
|---|
| OPENING RANGE CHANGE TYPE |
| OPENING THRESHOLD VALUE ACCESS NUMBER |
| MAXIMUM PERMITTED ACCESS NUMBER |
| NUMBER OF TIMES OF USER-UNIT ACCESS PERMISSION |

FIG. 21B

INITIAL OPENING RANGE

| 1 | OPENING TO THE PUBLIC |
|---|---|
| 2 | OPENING TO SPECIFIC PERSONS |

FIG. 21C

OPENING RANGE CHANGE TYPE

| 1 | RANGE EXPANSION |
|---|---|
| 2 | ACCESS RESTRICTION |
| 3 | HOLDING OF OPENING TO SPECIFIC PERSONS |

FIG. 23A

| ACCESS HISTORY INFORMATION |
|---|
| CORRESPONDING CONTENT ID |
| TOTAL ACCESS COUNT |
| USER ACCESS HISTORY |

FIG. 23B

| USER ID | USER-UNIT ACCESS COUNT |
|---|---|
| USER ID | USER-UNIT ACCESS COUNT |
| USER ID | USER-UNIT ACCESS COUNT |
| USER ID | USER-UNIT ACCESS COUNT |

# INFORMATION PROCESSING SYSTEM, INFORMATION PROCESSING APPARATUS, SERVER APPARATUS, INFORMATION PROCESSING METHOD, AND PROGRAM

CROSS REFERENCES TO RELATED APPLICATIONS

The present invention contains subject matter related to Japanese Patent Application JP 2007-102854 filed in the Japanese Patent Office on Apr. 10, 2007, the entire contents of which being incorporated herein by reference.

BACKGROUND OF THE INVENTION

1. Field of the Invention

The present invention relates to an information processing system capable of performing, for example, music distribution or file sharing through a network and an information processing apparatus (terminal apparatus) and a server apparatus included in the information processing system. In addition, the present invention relates to a program executed by the information processing apparatus.

2. Description of the Related Art

In a network, a service called CGM (consumer generated media) is widely spread and is well known. In the case of CGM, information distributed by an individual user at a consumer side is provided as a Web site where the information is managed in a database or as media. As typical examples, not only an SNS (social networking service) and a blog but also a sharing site of photographic images, a video content contribution site, and the like are known. Through such spreading of CGM, a normal individual user can give his or her own expression to a third party more easily than before.

An example of the related art includes JP-A-2006-190200.

SUMMARY OF THE INVENTION

In the case of a current service of CGM that is actually known, for example, in cases of a blog, a photographic image sharing site, and a video content contribution site, it is common that contents contributed or uploaded to a server are uniformly opened to the public. However, as an example, depending on a user, it is expected that there will be not a few cases where when contributing contents created by the user or specific contents to a CGM service so as to be opened to a third party, the contents created by the user or the specific contents are first opened to only acquaintances and an opening range expands to an opening range including a third party other than the acquaintances according to a situation, such as evaluation of the acquaintances. For such a user, it is difficult to use a service of CGM, which uniformly opens contributed contents to the public as described above, even though the user desires to use the service. On the other hand, in the case of the SNS, a user can set an opening range of a site for every individual, for example, like "up to friends", "up to friends of a friend", or "opening to the public". However, such opening range setting is performed in the unit of an individual site. Accordingly, assuming that text as a diary, a photograph, a video, and the like included in an individual site are individual contents, opening ranges of the contents cannot be individually set.

That is, as for a service of contents opening on a network under the current circumstances, a degree of freedom of setting regarding which kind of opening method (opening mode) is to be used is not high. Therefore, it can be said that there are lots of rooms for improvements for making an individual user easily use the service by realizing a higher degree of freedom of setting.

Therefore, in view of the above, according to an embodiment of the present invention, there is provided an information processing apparatus including at least an open server apparatus and a terminal apparatus communicable with each other through a network. In addition, the information processing system is configured to include: an opening mode setting means for setting an opening mode, which is a mode in opening contents uploaded to the open server apparatus on the network, according to an input operation in the terminal apparatus; a transmitted content information creating means for creating content information including at least body information, which is data used to reproduce substantial contents, and predetermined additional information as information of the contents uploaded to the open server apparatus in the terminal apparatus, at least opening instruction information indicating contents of an opening mode of current contents set by the opening mode setting means being created as the additional information; a content information storing means for storing content information in the open server apparatus; a content information upload control means for transmitting content information, which has been created by the transmitted content information creating means, from the terminal apparatus to the open server apparatus by communication through the network so as to store the content information in the content information storing means; and an opening mode determining means for determining an opening mode of the content information stored in the content information storing means on the basis of the opening instruction information of the content information in the open server apparatus.

Furthermore, according to another embodiment of the present invention, there is provided an information processing apparatus including: a communication means for executing a communication through a network; an opening mode setting means for setting an opening mode, which is a mode in opening contents uploaded to an open server apparatus on the network, according to an input operation; a transmitted content information creating means for creating content information including at least body information, which is data used to reproduce substantial contents, and predetermined additional information as information of the contents uploaded to the open server apparatus, at least opening instruction information indicating contents of an opening mode of current contents set by the opening mode setting means being created as the additional information; and a content information upload control means for transmitting content information, which has been created by the transmitted content information creating means, to the open server apparatus, which executes opening of contents in a condition based on the opening instruction information, by communication through the network.

Furthermore, according to still another embodiment of the present invention, there is provided a server apparatus including: a communication means for executing a communication through a network; a content information storing means for storing content information including an opening instruction information which has at least body information, which is data for reproducing substantial contents, and predetermined additional information and which is created according to an input operation from a terminal apparatus side that transmits content information to the server apparatus, the additional information indicating at least contents of an opening mode that is a mode in opening current contents on the network; a download response processing means for executing required processing in response to access from a terminal apparatus for downloading content information, which is stored in the content information storing means, through the network; and an opening mode determining means for determining an opening mode of content information stored in the content information storing means on the basis of the opening instruction information included in the content information.

According to each configuration described above, first, content information can be transmitted to be uploaded to an open server apparatus (server apparatus) by an information processing apparatus as a terminal apparatus. Here, for example, it is possible to realize a system configuration of opening content information uploaded from a terminal apparatus in an open server apparatus if the open server apparatus has a function of opening stored contents to the public. In addition, content information transmitted for upload is configured to include body information corresponding to the contents and additional information, and the additional information includes opening instruction information. The opening instruction information indicates the contents of a mode (opening mode) when the open server apparatus opens the contents on the network. In addition, an opening mode which is the origin of the opening instruction information is set by an input operation on an information processing apparatus as a terminal apparatus. In addition, in the open server apparatus, an opening mode of contents uploaded to the open server apparatus is determined on the basis of contents of the opening instruction information added to the contents. According to such a configuration, in the present invention, first, an opening mode can be individually set for every content information since an opening mode is determined on the basis of opening instruction information added to every content information. In addition, since opening instruction information is created according to an input operation on a terminal apparatus, the intention of a person who has performed an input operation, that is, the intention of a person who has uploaded content information is reflected on corresponding contents.

As is apparent from the above, in the embodiments of the present invention, an opening mode of contents uploaded to an open server apparatus can be individually set for every contents according to the intention of a person who has uploaded the contents. As a result, a degree of freedom regarding an opening mode becomes improved than before.

BRIEF DESCRIPTION OF THE DRAWINGS

FIG. 6 is a view illustrating an example of the internal configuration of a primary content server;

FIG. 13 is a view illustrating an example of the structure of used primary content information and used editing material content information in a secondary content reproduction control file;

FIG. 21A is a view illustrating an example of contents of opening instruction information;

FIG. 21B is a view illustrating an example of contents of opening instruction information;

FIG. 21C is a view illustrating an example of contents of opening instruction information;

FIG. 23A is a view illustrating an example of contents of access history information;

FIG. 23B is a view illustrating an example of contents of access history information;

DESCRIPTION OF THE PREFERRED EMBODIMENTS

Figure 1:
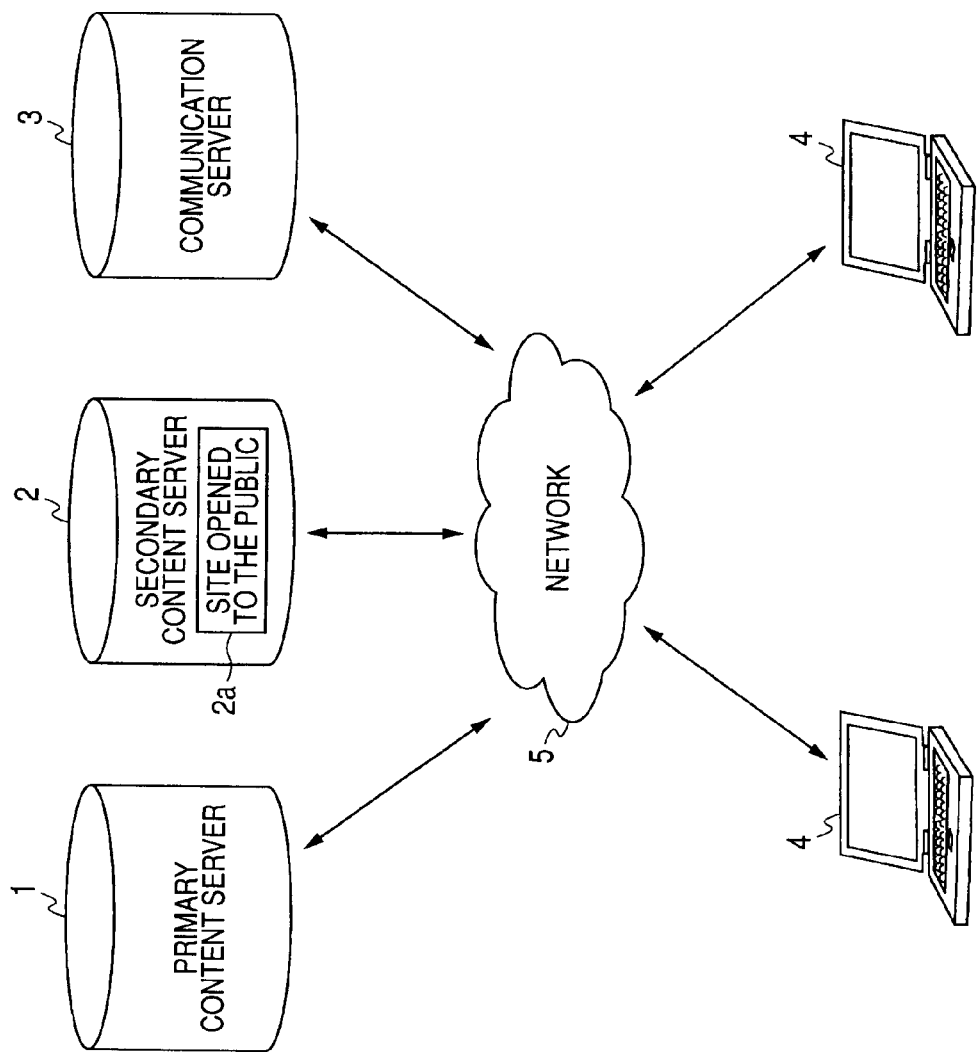
FIG. 1 is a view illustrating an example of the configuration of a music editing and sharing system according to an embodiment of the present invention.

FIG. 1 shows an example of the configuration of an information processing system according to a preferred embodiment (hereinafter, referred to as an "embodiment") for embodying the present invention. As shown in the drawing, first, an information processing system of the present embodiment may be formed by connecting a primary content server 1, a secondary content server (open server apparatus) 2, a communication server 3, and a plurality of user terminal apparatuses 4 to one another through a network 5. The information processing system according to the present embodiment realizes a music distributing and sharing system by adopting such an apparatus configuration. That is, as will be understood from the following description, so-called music distribution (distribution of primary contents) and sharing among users of contents (secondary contents), which are generated by the users, on a network are realized.

The primary content server 1 is configured to store a plurality of audio content data, which serves as primary contents and is based on a predetermined format, so as to be managed in a database. In addition, the primary content server 1 is configured such that audio data as designated primary contents is transmitted and output to the requesting user terminal apparatus 4 in response to a download request that is made from the user terminal apparatus 4 through a network. Here, the audio data as primary contents includes contents as music, which is performed by an artist and the like, provided by a cooperating label firm, for example.

The secondary content server 2 is configured to be able to store a plurality of data of a secondary content reproduction control file (secondary content information), which is data as secondary contents, so as to be compiled and managed as a database. As will be described later, the secondary content reproduction control file is uploaded from the user terminal apparatus 4 to the secondary content server 2 through a network. The secondary content server 2 stores the secondary content reproduction control file, which has been uploaded in this way, as secondary contents. In addition, the secondary content server 2 is configured such that a designated secondary content reproduction control file is transmitted and output to the requesting user terminal apparatus 4 in response to a download request that is made from the user terminal apparatus 4 through a network.

In addition, the secondary content server 2 in the present embodiment is configured to have a function as a web server for publicizing a site opened to the public 2a, which is a Web site designed to make the secondary contents opened to the public, on the network. As will be described later, methods of downloading data of secondary contents in the present embodiment include a method in which the user terminal apparatus 4 directly designates a URL (indicating a storage location of the secondary content information) in order to perform a download request (access) to the secondary content server 2 and a method in which the user terminal apparatus 4 accesses the site opened to the public 2a and searches, for example, one specific secondary content information from secondary content information opened to the public in order to download data.

The communication server 3 is a server having a function of providing an information transmission service by an individual user or providing a communication service among users like an SNS (social networking service) or a CGM (consumer generated media), such as a blog.

The user terminal apparatus 4 is a network apparatus that a normal user uses. As an actual example of the user terminal apparatus 4, there is a personal computer having a network communication function, such as a LAN. In the user terminal apparatuses 4, an application program of a music editing and sharing application 100 is installed, which will be described later. A user may perform downloading of primary contents from the primary content server 1, generation of new secondary contents by an editing work based on the downloaded primary contents (and secondary contents), uploading of the generated secondary contents (that is, a secondary content reproduction control file) to the secondary content server 2, downloading of the secondary contents (secondary content reproduction control file) from the secondary content server 2, use of an SNS service using the communication server 3, use of writing/access of a blog, and the like by operating the music editing and sharing application 100.

Figure 2:
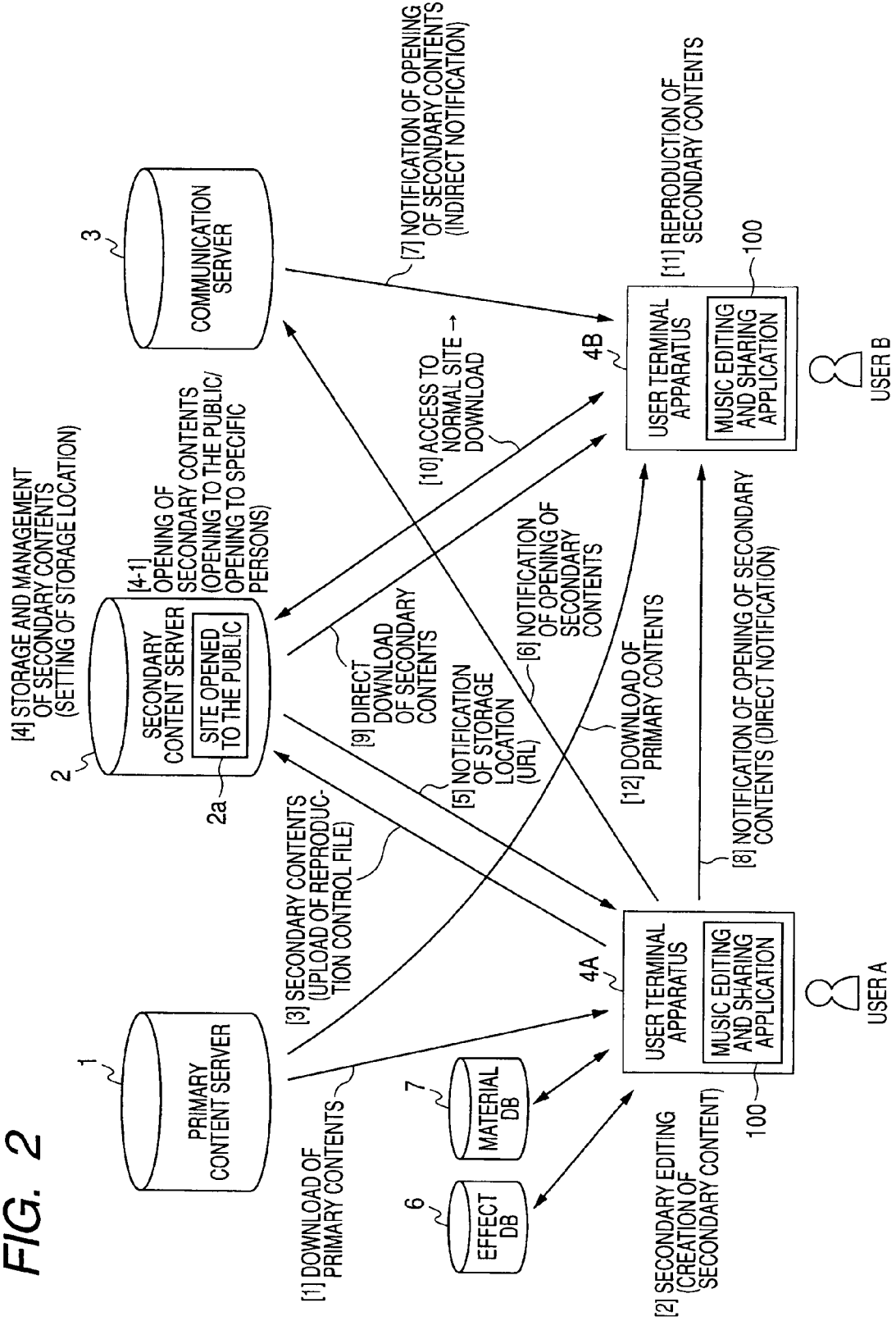
FIG. 2 is a view illustrating a basic use mode of the music editing and sharing system according to the embodiment and an example of procedures of a system operation corresponding to the use mode.

Next, an example of a basic operation of the information processing system according to the present embodiment in which the configuration shown in FIG. 1 is adopted will be described with reference to FIG. 2 by using an example of basic use performed by a user of the user terminal apparatus 4. In addition, description with reference to FIG. 2 is made according to numbers of procedures and operations shown by alphanumeric characters in [ ] in the drawing. Here, two user terminal apparatuses 4A and 4B that two users A and B use, respectively, are shown as the user terminal apparatuses 4. In addition, the network 5 existing among the primary content server 1, the secondary content server 2, the communication server 3, and the user terminal apparatuses 4 is not shown in the drawing.

Procedure 1: First, the user A performs an operation of causing the user terminal apparatus 4A (music editing and sharing application 100) to search primary contents that the user wants to download and of downloading the searched primary contents. According to the operation, the user terminal apparatus 4A transmits a download request to the primary content server 1.

Furthermore, in the music distributing and sharing system in the present embodiment, download of primary contents is basically charged. The user A needs to perform an appropriate purchase procedure in transmitting a download request to the primary content server 1 as described above. Regarding the purchase procedure, for example, a payment procedure for a fee that is set individually in the unit of a song or an album may be adopted or a subscription procedure called subscription, which is often adopted these days, may be adopted. In addition, the primary contents may be provided for free. In this case, the user A does not need to perform the purchase procedure.

In addition, when a download request is thus received, the primary content server 1 first determines whether or not the download request is a valid download request by performing authentication of a requesting user, checking payment of a fee, and the like, for example. Then, if it is determined that the download request is a valid download request, the primary content server 1 searches primary contents, which are designated together with the download request, from primary contents stored in the primary content server 1 and transmits data (primary content data) as the searched primary contents to the requesting user terminal apparatus 4. Here, for clear understanding of explanation, the substantial body of the primary contents that the primary content server 1 stores therein while performing database management are assumed to have a file structure that includes as main information audio data (data for reproducing substantial contents as primary contents), which is based on a predetermined format, having music contents as primary contents and that includes various kinds of metadata (song title, artist, and title, genre, data format, data size, and the like of a corresponding album) relevant to the basic information. That is, in the present embodiment, it is assumed that the primary content data has a structure having digital audio data, which allows the music contents to be obtained by performing a music reproduction output, as main data.

The primary content data transmitted from the primary content server 1 as described above is received by the user terminal apparatus 4A. The user terminal apparatus 4A (music editing and sharing application 100) stores the received primary content data in a storage medium, such as an internal HDD. The music editing and sharing application 100 has a function of managing the primary content data stored as described above in a predetermined method, for example, on the basis of metadata and of executing a reproduction control corresponding to a user's operation. Thus, the primary content data stored in the primary content server 1 can be downloaded to the user terminal apparatus 4 in principle that a user purchases the primary content data. That is, so-called music distribution is performed as a first procedure (operation). In addition, the primary content data stored in the user terminal apparatus 4A may be reproduced by the music editing and sharing application 100 and, for example, be heard through an audio device connected to the user terminal apparatus 4A.

Procedure 2: In general, in the case of music distribution performed through a network, use after download is restricted to use, such as reproduction after copy restriction on predetermined digital audio data is applied. That is, a user who has acquired audio contents by download is permitted to use the audio contents within a predetermined range, but it is general that a right to create a song as secondary creation, for example, by performing edition on the basis of the acquired audio contents is not granted to the user. On the other hand, in the present embodiment, it is assumed in principle that the primary content data is audio contents which are permitted to be used (secondary use and secondary editing) as materials for secondary creation within a range set beforehand. Furthermore, for clear understanding of explanation, the secondary use of primary contents in the present embodiment is set within a range of a right permitted by a writer of a song as primary contents. In addition, the music editing and sharing application 100 in the present embodiment may create audio contents as new music by executing editing processing corresponding to a user's operation by secondarily using the primary contents, which are managed (stored) by the music editing and sharing application 100, as editing materials. Furthermore, for example, when editing such audio contents, it may be possible to acquire plug-in data corresponding to a predetermined special effect, which is provided in an effect database 6, and to perform editing using the acquired data. Similarly, it may be possible to acquire sound materials provided in a material database 7 and to perform editing while adding the sound materials. In addition, the effect database 6 and the material database 7 may be provided on a network or may locally exist in the user terminal apparatus 4A. Here, the audio contents created as described above are referred to as secondary contents in order to distinguish the audio contents from primary contents. As a second procedure (operation), one secondary content is created by causing the music editing and sharing application 100 to perform an operation on the user terminal apparatus 4A, which is in an operation state.

Figure 3:
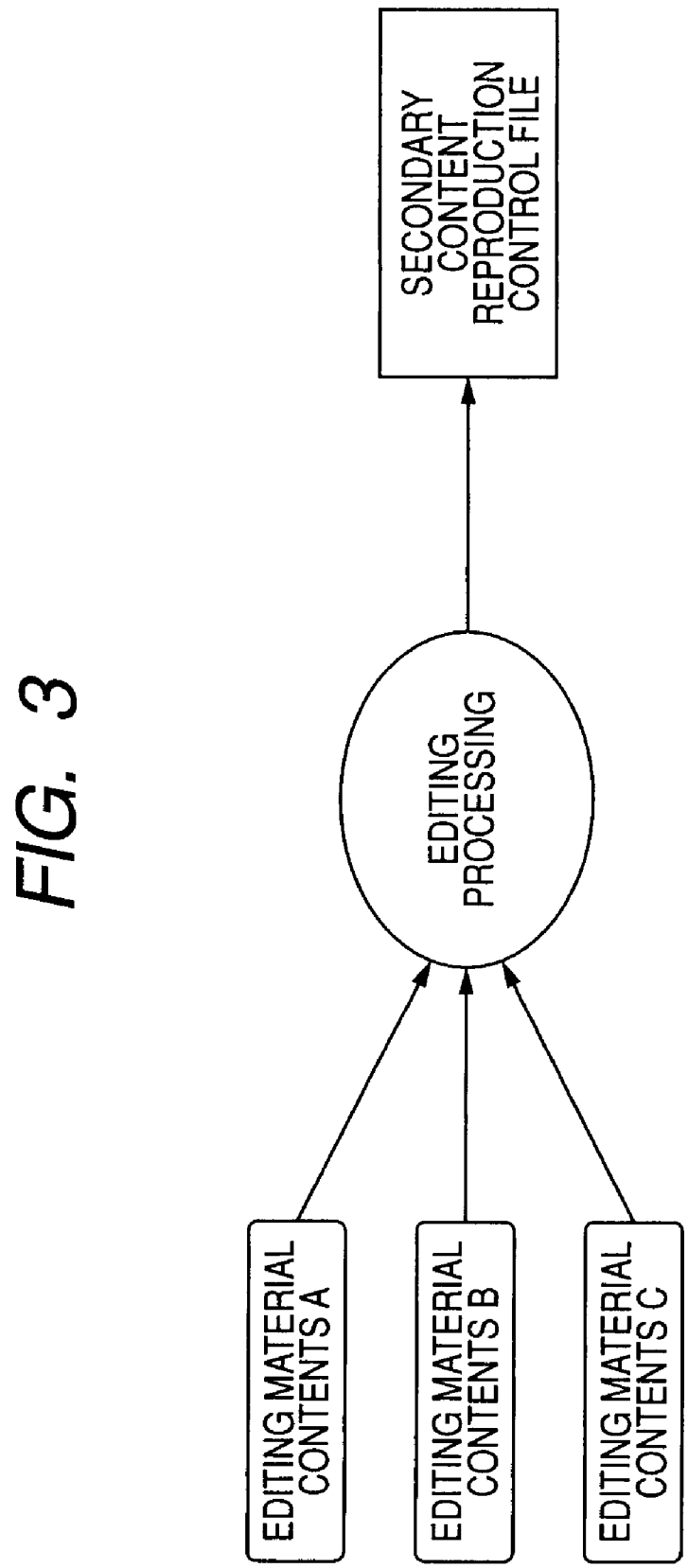
FIG. 3 is a view schematically illustrating a flow of secondary content creation executed by a user terminal apparatus in the embodiment.

In addition, the substantial body of data as the secondary contents created through the second procedure (operation) is configured to have reproduction control information as a main body, which is not digital audio data having the music contents unlike the primary contents. That is, the data as the secondary contents is reproduction control information in which designation of an effect (special effect) and the like starting from designation on which part of digital audio data as secondary audio contents (editing material contents) is reproduced and output at which timing are described. That is, as a flow of secondary editing performed by the music editing and sharing application 100, as schematically shown in FIG. 3, secondary content reproduction control information that is not configured to include audio data but configured to include reproduction control information is created and output as a result of performing editing processing corresponding to a user's operation by using editing material contents A, B, and C that are objects of secondary use.

The data size of the secondary content data (that is, secondary content reproduction control information) as the reproduction control information can be significantly reduced when compared with audio data, for example. Thus, the secondary content server 2 can be efficiently used by saving the storage capacity of a storage medium, such as an HDD, in which secondary content data is stored. In addition, since the amount of data to be transmitted may be small even in transmitting and receiving the secondary content data on a network, for example, a traffic load does not occur.

It is called sampling, mashup, and the like to create secondary creation as new music by performing editing using known music as materials like the secondary editing in the present embodiment, which are often performed by professional musicians and the like. Taking the above into consideration, it is natural that some of the public may have a desire to create music as a secondary work in the same manner as described above. However, it is very difficult that the public creates music as a secondary work in a condition in which a problem related with copyright is properly cleared.

Therefore, as a music distributing and sharing system in the present embodiment, first, it is preferable to increase user's pleasure by permitting a normal user to legally perform secondary editing using distributed music. For this reason, primary contents are set as audio contents that a user, who downloads (purchases) the contents, is permitted to secondarily use in a range of a right permitted by a copyright holder. That is, a music distribution service performed by the primary content server 1 according to the present embodiment distributes audio contents whose second use is positively permitted. However, in the present embodiment, a work of editing primary contents for secondary use is limited to a user's operation on the music editing and sharing application 100 developed corresponding to at least a music editing and sharing system according to the present embodiment. For example, it is difficult to perform the work of editing primary contents with other editing software which is not related to the music editing and sharing system according to the present embodiment. A structure for this will be described later.

Procedure 3: The secondary content reproduction control file as secondary contents created by the user A like the procedure 2 is stored only in the terminal apparatus 4A of the user A, such that a sound of music contents as the secondary contents may be reproduced by performing processing using a reproduction function of the music editing and sharing application 100 as will be described later with reference to FIG. 4. Furthermore, in the present embodiment, by permitting secondary contents created by a user to be opened to the public on a network so that other users who receive a service of the music editing and sharing application 100 in the present embodiment may share the secondary contents. It is assumed that the user A desires to share secondary contents created in the previous procedure 2. Therefore, the user A uploads the secondary contents created in the procedure 2 to the secondary content server 2 by performing a predetermined operation on the music editing and sharing application 100. This is the procedure 3. As described earlier, the substantial body of data as secondary contents serves as a secondary content reproduction control file. Therefore, by upload of the secondary contents in the procedure 3, the user terminal apparatus 4A (music editing and sharing application 100) transmits and outputs the secondary content reproduction control file together with an upload request.

Procedure 4 and the 4-1: When the upload request is received as described above, the secondary content server 2 newly registers and stores a secondary content reproduction control file, which is data of the secondary contents transmitted together with the request, in a database in principle. In this case, the secondary content server 2 performs processing for storing the secondary content reproduction control file and registration to the database after setting a storage location (for example, expressed by an address, such as a URL (uniform resource locator)). This is the procedure 4.

In addition, the secondary content server 2 has a function of opening the secondary contents registered in the database to the public by registering the data of the secondary contents in the database as described above. That is, as a procedure 4-1, the secondary content server 2 opens the secondary contents, which are registered in the database in the procedure 4, to the public. Here, in the present embodiment, opening of the secondary contents include two modes of opening to the public and opening to specific persons. First, opening to the public refers that the secondary content server 2 permits secondary contents to be opened to the public on the site opened to the public 2a that is opened on a network. The site opened to the public 2a is a site whose URL, for example, is generally opened to the public and that a "normal user" can access through a network without any limitation. Moreover, in the site opened to the public 2a, data of secondary contents uploaded to the secondary content server 2 and stored in the secondary content server 2 is not opened to the public without any condition but only data, which is set to be opened to the public as a result of satisfying a predetermined condition, is registered and opened to the public. In the site opened to the public 2a, the secondary contents registered as contents to be opened to the public as described above are managed by using a database (database of secondary contents opened to the public), for example. In addition, the registered secondary contents are presented on a predetermined interface screen. For example, at a side of the user terminal apparatus 4, it is possible to search the secondary contents registered in the database of secondary contents opened to the public and to download desired secondary contents through an operation on the interface screen of the site opened to the public 2a. In addition, it depends on the management of the music editing and sharing system according to the present embodiment which kind of user is specifically indicated by a normal user who enjoys the opening to the public referred herein, that is, which kind of permission condition on access in opening the site opened to the public 2a on a network. For example, it is first considered that any kind of network terminal in which a web browser is installed is permitted to access the open site 2a. That is, the normal user in this case refers to a person capable of accessing an arbitrary Web site on a network (for example, Internet) by operating a Web browser of a terminal apparatus. Alternatively, it may be possible to consider an opening method in which only a user registered as a user of the music editing and sharing system according to the present embodiment is permitted to have access from the music editing and sharing application 100 (web browser may also be considered). In this case, it is considered to adopt a system configuration in which a user ID and a password for authentication set at the time of registration are required to be input for access (login) to the site opened to the public 2a. The normal user in this case is all users registered as persons using the music editing and sharing system according to the present embodiment. In any case, a user who can access the site opened to the public 2a under the opening to the public has the generality, as compared with a case in which there occurs a limitation in a user capable of accessing one secondary content in the case of opening to specific persons to be described below. The opening to specific persons refers a mode of opening in which opening to the public using the site opened to the public 2a is not performed but secondary contents stored in a designated URL is transmitted to a requesting source, in principle, in response to a download request that is made from the user terminal apparatus 4 (for example, the music editing and sharing application 100 or a Web browser) to the secondary content server 2 by directly designating the URL. That is, since the secondary contents opened to specific persons are not registered in the site opened to the public 2a, all normal users may not download the secondary contents by access through the site opened to the public 2a. However, as for secondary contents opened to specific persons, some limited users of normal users can acquire information on a URL of the secondary contents through notification of the URL of the secondary contents individually distributed by a creator or word-of-mouth transmission of information notification on a network. Furthermore, in principle, the secondary content server 2 permits secondary contents, of which a URL is directly designated, to be downloaded regardless of opening to the public or opening to specific persons. Accordingly, a user who has acquired the URL as described above can download the secondary contents by accessing the URL by operating the user terminal apparatus 4. In this manner, the secondary content server 2 in the present embodiment is configured such that the secondary contents downloaded and stored through the procedure 3 are opened on the basis of one mode of the opening to the public and the opening to specific persons. In addition, it will be described later how the secondary content server 2 selects a mode of opening the secondary contents between opening to the public and the opening to specific persons.

Procedure 5: After a secondary content reproduction control file is stored and managed in an opening state of the opening to the public or the opening to specific persons as described above, the secondary content server 2 transmits an address (storage location address), which indicates a storage location, to the user terminal apparatus 4A of an upload requesting source in order to notify the storage location from which the secondary contents (secondary content reproduction control file) have been uploaded. The music editing and sharing application 100 of the user terminal apparatus 4A receives the storage location address and stores the received storage location address in a predetermined storage medium so as to manage the storage location address. The user A can output the storage location address of the secondary contents that he or she has uploaded in the procedure 2 any time by performing a predetermined operation on the music editing and sharing application 100.

Procedure 6: Then, the user A who has acquired the storage location address as described above may notify other users that his or her secondary contents are opened in the secondary content server 2 through some means. Since the procedure 6 corresponds to one means of the opening notification, a user may access the communication server 3 in order to write a notification, which indicates that secondary contents created by the user are opened (opening herein may be either opening to the public or opening to specific persons), in his or her page in the SNS, his or her blog, and the like, as shown in the drawing. In this case, the user A may write a URL as a storage location address, which is acquired in the procedure 5, together with the notification.

Procedure 7: When, for example, a user B accesses the page of the user A in the SNS or the blog of the user A by operating the music editing and sharing application 100 installed in the user terminal apparatus 4B after the user A performed writing in the procedure 6, it is notified to the user B that the secondary contents of the user A has been newly opened to the public. That is, in this case, the user B indirectly receives a notification regarding new opening of the secondary contents, which have been created by the user A, through the SNS or the blog. The procedure 7 indicates that such indirect notification of opening of secondary contents is performed.

Procedure 8: In addition, a procedure 8 is prepared as another means for opening notification. In the procedure 8, for example, the user A notifies the user B that the secondary contents created by the user A have been opened to the public by creating and transmitting a mail using a mail function provided in the SNS. This is a more direct notification than a notification based on a flow of the procedures 6 and 7. In addition, even when making a notification using an E-mail or the like as described above, a storage location address of the secondary contents may be added in the body, for example.

Furthermore, in the procedures 7 and 8, an explanation on notification of opening of secondary contents has been limited to notification between two persons of the users A and B for the convenience of explanation. However, in actuality, the notification is often performed among three or more persons. As an example, there is a case in which the user B receives a notification from the user A and then the user B notifies another user that the user A opens the secondary contents to the public in a blog or a page of the SNS distributed by the user B through a means as the procedure 7 or the procedure 8. Thus, information distributed from one place spreads through a word-of-mouth communication path on a network. The information transmission on such a network may also be regarded as one mode of notification of opening of secondary contents in the present embodiment.

Procedure 9: In such a manner described above, the user B can see that the secondary contents created by the user A have been newly opened to the public since the user B directly or indirectly receives a notification that the secondary contents created by the user A have been newly opened to the public. In addition, if the user desires to listen to the newly opened secondary contents of the user A, the user B can download the secondary contents by executing access with the music editing and sharing application 100 (or web browser) of the user terminal apparatus 4. This is the procedure 9. When downloading the secondary contents, for example, a clicking operation on a storage location address shown as a link within the body of a page of a diary of the SNS or a blog is performed. For clear understanding of explanation, in the case where information on an address, such as a URL, is written in performing writing on a page of a diary of the SNS or a blog, this character string portion is opened as a link. In response to the clicking operation performed for the storage location address as described above, the music editing and sharing application 100 accesses the storage location address. That is, the music editing and sharing application 100 accesses an address indicating a location where a file (secondary content reproduction control file) of secondary contents, which have been created by the user A and are opened to the public, among addresses on the secondary content server 2. Then, the secondary content reproduction control file stored in the storage location is transmitted to the user terminal apparatus 4B. Then, the secondary content reproduction control file transmitted as described above is received at a side of the user terminal apparatus 4B and is stored and managed by a control of the music editing and sharing application 100. Thus, downloading of the secondary contents is performed. Direct and indirect notification of opening of secondary contents to the user B in the above-described procedures 7 and 8 and downloading of secondary contents in the procedure 9 correspond to notification of a URL of secondary contents to other users and downloading based on directly designating a URL that is a storage place of the secondary contents, respectively, which have been already described as those performed at the time of opening to specific persons. In this case, as already described above, procedures of the notification and downloading based on the procedures 7, 8, and 9 may also be applied to secondary contents that are opened to the public through the site opened to the public 2a.

Procedure 10: In addition, the user B is entitled, as a "normal user", to access the site opened to the public 2a, which is a web server opened to the public in the secondary content server 2, by means of the user terminal apparatus 4B. Then, the user B can access the site opened to the public 2a by operating the user terminal apparatus 4B (music editing and sharing application or web browser), search desire secondary contents as described above, download the searched secondary contents, and then store and manage the downloaded secondary contents. In the case of downloading the secondary contents by directly using information on a URL like the procedure 9, only secondary contents corresponding to a URL acquired as a result of, for example, notification or word-of-mouth transmission can be downloaded. In contrast to those described above, in the procedure 10, secondary contents opened to the public are set as candidates to be selected and arbitrary contents are selected from the secondary contents and then the selected contents are downloaded.

Procedure 11: After the secondary contents of the user A downloaded in the procedure 9 as described above are stored or the secondary contents downloaded in the procedure 10 are stored, the secondary contents can be reproduced by the music editing and sharing application 100 of the user terminal apparatus 4B. The procedure 11 is a procedure in which a song as the secondary contents is reproduced and output as a sound in response to an reproduction instruction operation of the user B using the music editing and sharing application 100.

Figure 4:
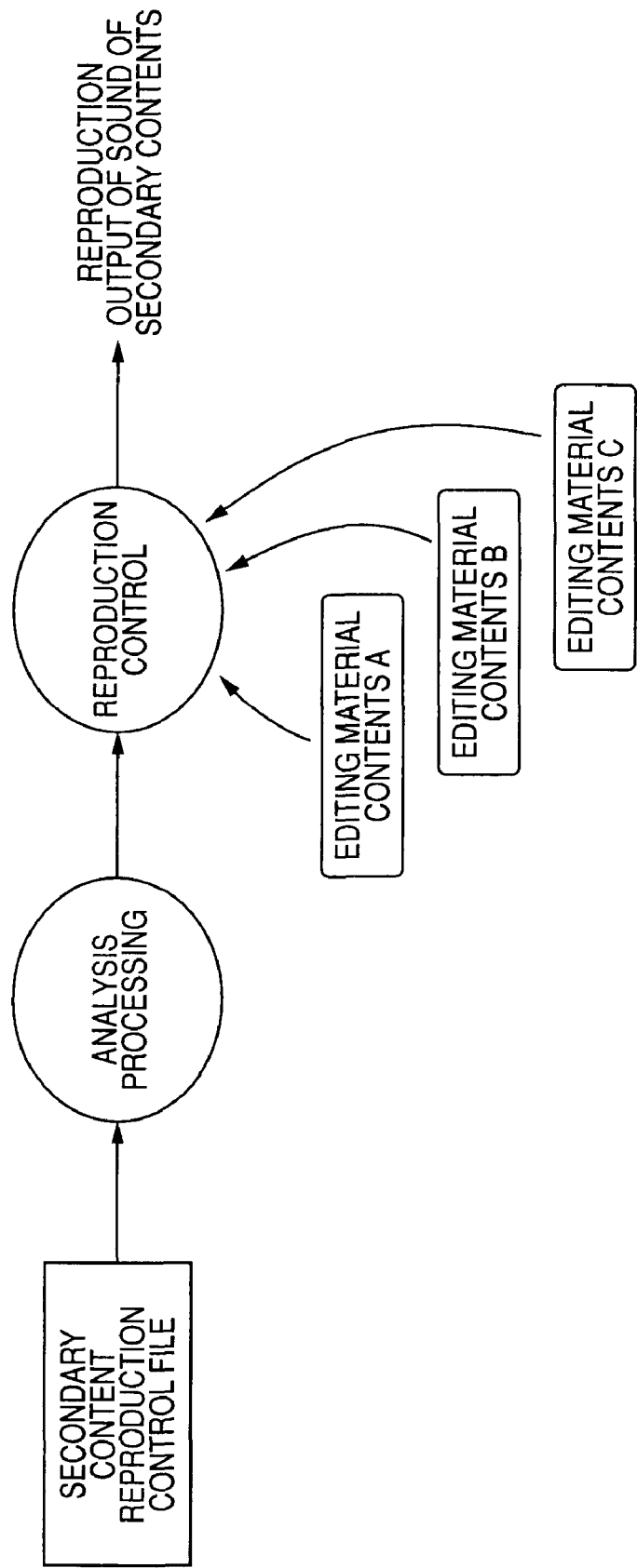
FIG. 4 is a view schematically illustrating a flow of secondary content reproduction executed by the user terminal apparatus in the embodiment.

Here, a concept of reproduction of secondary contents performed by the editing and sharing application 100 is shown in FIG. 4. In reproduction of the secondary contents, the music editing and sharing application 100 first analyzes a secondary content reproduction control file that is the substantial data. As a result of the analysis, for example, it can be recognized at least which audio contents are used as editing material contents, and which portion in each of the editing material contents is used in which way and in which reproduction time, and the like. Moreover, in this drawing, it is assumed that each of the audio contents of the editing material contents A, B, and C is used as an editing material corresponding to FIG. 3 described earlier. In addition, according to the recognition result, the music editing and sharing application 100 executes a reproduction control by using at least actual audio data as the editing material contents A, B, and C. As a result, contents of a song as secondary contents are reproduced as sound.

In addition, according to the above description with reference to FIG. 4, actual audio data as audio contents (editing material contents) secondarily used in the secondary contents is required for reproduction of the secondary contents. That is, in order to reproduce secondary contents, actual audio data of editing material contents needs to exist on the same local as the music editing and sharing application 100 even if it is temporary. Therefore, if corresponding editing material contents are not stored on the local when secondary contents are reproduced, it is necessary to acquire the editing material contents so that the editing material contents can exist on the local.

Procedure 12: Then, in the above case, it is necessary to execute a procedure for downloading and acquiring the editing material contents which do not exist on the local. The procedure 12 shown in FIG. 2 is a procedure for executing those described above in a process of content reproduction through the procedure 11. As can be understood from description up to now, since editing material contents are actual audio data, the editing material contents are, in principle, primary contents. Therefore, in the procedure 12, access to the primary content server 1 is performed to download primary contents which are required for reproduction of the secondary contents in the procedure 11 and which do not exist on the local. By the download, the editing material contents required for reproduction of the secondary contents come to exist all on the local. As a result, it becomes possible to normally execute reproduction and output as described above with reference to FIG. 4.

In addition, several states may be considered as states of audio data of the primary contents which exist on the local by the download in the procedure 11. As a first example, a mode in which primary contents are present on the local in a state where the primary contents are stored in an auxiliary storage device, such as an HDD, like the case of normal downloading in the procedure 1 may be considered. As another example, a mode in which primary contents are temporarily stored in a main storage device, such as a RAM and, for example, the primary contents are deleted according to a state of the music editing and sharing application 100 whose reproduction operation on the secondary contents is not permitted may also be considered. For example, although it has been described that primary contents are charged in principle, management, such as no charge or setting of a fee cheaper than normal download may be considered in the latter case.

Figure 5A:
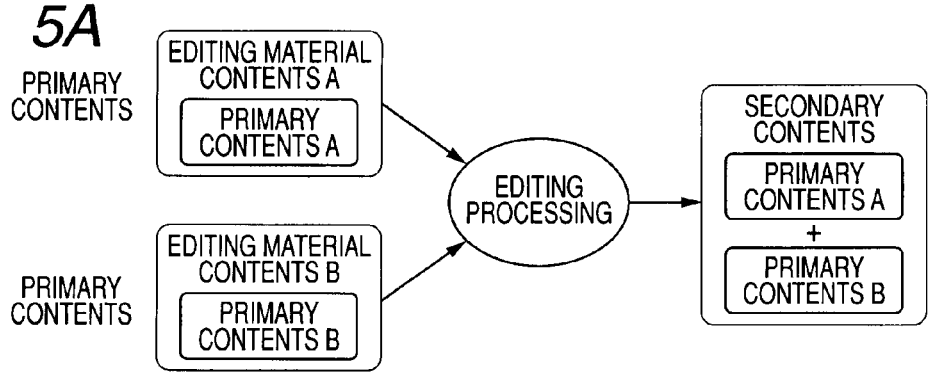
FIG. 5A is a view illustrating an example of a use mode of editing material contents in creating secondary contents.
Figure 5B:
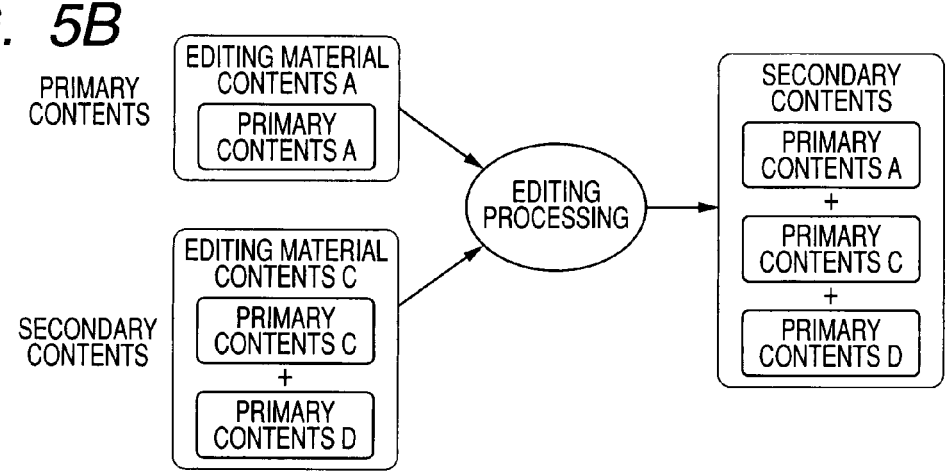
FIG. 5B is a view illustrating an example of a use mode of editing material contents in creating secondary contents.
Figure 5C:
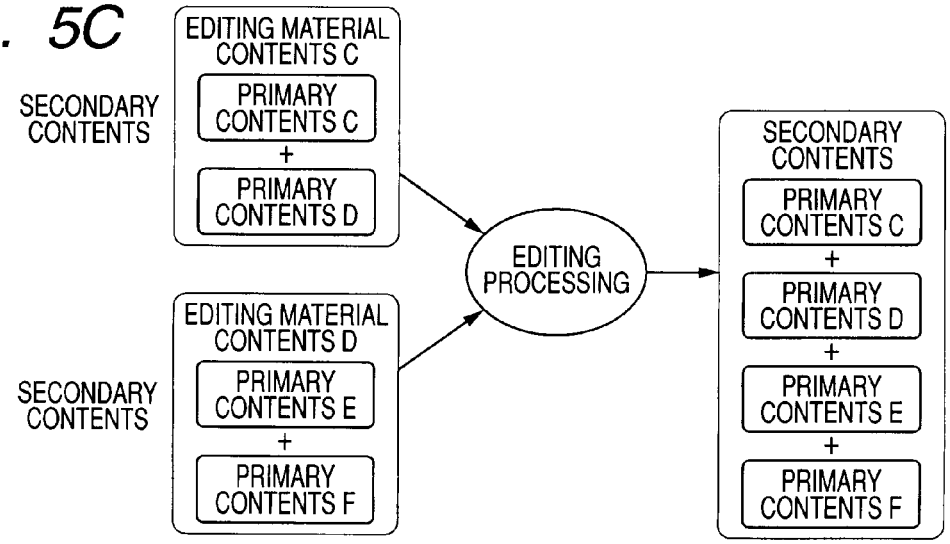
FIG. 5C is a view illustrating an example of a use mode of editing material contents in creating secondary contents.

In addition, according to the above description with reference to FIG. 2, creation of secondary contents in the present embodiment is performed by using primary contents as editing material contents. However, not only the primary contents but also secondary contents may be included as editing material contents. This point will now be described with reference to FIGS. 5A to 5C. FIGS. 5A to 5C illustrate cases in which one secondary content is created by performing editing by secondarily using two editing material contents. First, FIG. 5A illustrates a case where editing material contents A and B are primary contents, which is similar to the example of creation of secondary contents described with reference to FIG. 2. That is, a case in which secondary contents are created by executing editing processing using primary contents A as the editing material contents A and primary contents B, which are primary contents different from the primary contents A, as the editing material contents B is shown. In this case, the secondary contents are configured to include at least a part of the primary contents A and the primary contents B as contents, as shown in the drawing. That is, the primary contents A and B are used as editing materials (original editing materials) of an origin. FIG. 5B illustrates a case in which secondary contents can be created by performing editing by using the editing material contents A, which are the same primary contents as in FIG. 5A, and editing material contents C, which are secondary contents created by secondarily using primary contents C and D. In this case, the secondary contents have at least a part of the primary contents A included in the editing material contents A and at least a part of each of the primary contents C and D included in the editing material contents C, thereby forming contents of a song. That is, the primary contents A, C, and D serve as original editing materials. Accordingly, in the case of reproducing new secondary contents shown in FIG. 5B, it is necessary to place the primary contents A, C, and D on the local. FIG. 5C illustrates a case in which secondary contents can be newly created by performing editing by secondarily using two editing material contents C and D which are secondary contents. In this case, the newly created secondary contents have at least a part of each of the primary contents C and D included in the editing material contents C and at least a part of each of primary contents E and F included in the editing material contents D, thereby forming contents of a song. Accordingly, in the case of reproducing new secondary contents shown in FIG. 5C, it is necessary to place the primary contents C, D, E, and F, which are original editing materials, on the local. Moreover, in the case of using secondary contents as editing material contents for creating secondary contents as shown in FIGS. 5B and 5C, the user first performs, for example, downloading in order to place the secondary contents as editing material contents on the local such that the secondary contents are stored in the user terminal apparatus 4, in the same manner as the case in which primary contents are treated as editing material contents.

In addition, when the secondary content server 2 transmits secondary content data in response to a secondary content download request in the procedure 9 shown in FIG. 2, the secondary content data is encoded. The encryption can be decoded by the music editing and sharing application 100 of a regular user. At this time, the music editing and sharing application 100 is made to operate such that only secondary content data decoded through the encryption processing is reproduced but, for example, secondary contents which are not encoded from the origin or secondary contents which are encoded on the basis of another method or an algorithm. That is, the music editing and sharing application 100 reproduce only secondary content data, which is acquired by downloading from the secondary content server 2, among secondary contents acquired from the outside. Accordingly, even if direct exchange of a secondary content file among users occurs, for example, through a network communication based on P2P (pier to pier), file attaching in an E-mail, direct communication among user terminal apparatuses based on an FTP (file transport protocol) or the like, or exchange among users using removable media, the file cannot be appropriately reproduced since the file that a user thus acquires is not encoded by the secondary content server 2. That is, in the present embodiment, secondary contents of other persons cannot be appropriately reproduced if the secondary contents are not downloaded from the secondary content server 2. As a result, in the music editing and sharing system according to the present embodiment, it is prevented that illegal secondary contents in violation of copyright circulate and increase on a network. Thus, it is possible to protect the right of copyright holders of primary contents and secondary contents, for example.

As can be understood from the above description with reference to FIGS. 2 and 5A to 5C, in the music distributing and sharing system according to the present embodiment, first, downloading of primary contents is possible. That is, a user can download (purchase) a favorite song through normal music distribution and listen to and enjoy the song. Furthermore, since the use right is set in the primary contents such that the primary contents can be secondarily used as editing materials, the user can create his or her own work by performing editing using the primary contents as materials. Moreover, secondary contents, which are works created in such a way, may also be opened to the public by using a communication technique, such as an SNS and a blog. That is, it is possible to appropriately perform an act in which a normal user performs editing by using a song with copyright as a material to thereby newly create audio contents (secondary contents) and opens the secondary contents to the public, which has been legally difficult due to problems, such as copyright.

Furthermore, in the present embodiment, substantial information (body information) of the substantial body of secondary contents is reproduction control information formed including at least description which instructs reproduction of the primary contents, which are original editing materials used in the corresponding secondary contents. The music editing and sharing application 100 has not only a function of reproducing secondary contents but also a function of creating secondary contents. For this reason, as a mode of reproduction of secondary contents, not only processing for sound reproduction can be executed but also edited contents of secondary contents reproduced can be reflected on a user interface having the editing function, for example. That is, as a benefit that the substantial contents of secondary contents are reproduction control information, the user can see in detail how the downloaded secondary contents are edited by using the editing function of the music editing and sharing application 100.

Next, an example of the technical configuration for realizing the use and operations as the music distributing and sharing system in the present embodiment, which has been explained heretofore, will be described. First, FIG. 6 illustrates an example of the internal configuration of the primary content server 1. As shown in the drawing, the primary content server 1 includes a control unit 11, a storage unit 12, an authentication processing unit 13, a search processing unit 14, a database managing unit 15, a payment processing unit 16, an encryption processing unit 17, and a network interface 18.

The control unit 11 is a unit that executes an overall control of various kinds of control processing in the primary content server 1. The storage unit 12 is configured to include, for example, an HDD and stores a primary content database 12a therein. The primary content database 12a is an information unit in which an audio data file as primary contents to be distributed is compiled as a database. In addition, the audio data file as primary contents has a predetermined format including various kinds of metadata in addition to actual data as audio data.

For example, when a download request is made, the authentication processing unit 13 executes required authentication processing for determining whether or not the user is a regular user by using a user ID or a password included in the request. Transmission of primary contents corresponding to the request is performed only when a result of the authentication processing is O.K.

The search processing unit 14 is a unit that executes processing for searching desired primary contents in collaboration with the database managing unit 15 by accessing the primary content database 12a. The database managing unit 15 performs management of the primary content database 12a. For example, in the case when new primary contents are supplied, the database managing unit 15 updates the primary content database 12a such that the new primary contents are registered in the primary content database 12a. Similarly, in the case when primary contents need to be deleted, deletion of the primary content data and updating of database according to the deletion are performed.

The payment processing unit 16 executes processing of payments, which are related with payment of a user regarding charged primary contents.

The encryption processing unit 17 is a unit that executes predetermined encryption processing on primary content data which is to be transmitted from the primary content server 1 to the user terminal apparatus 4.

The network interface 18 is a unit for performing a communication through the network 5. For example, reception of a download request and transmission of primary content data corresponding to the download request are realized when the network interface 18 executes communication processing according to a control of the control unit 11.

Figure 7:
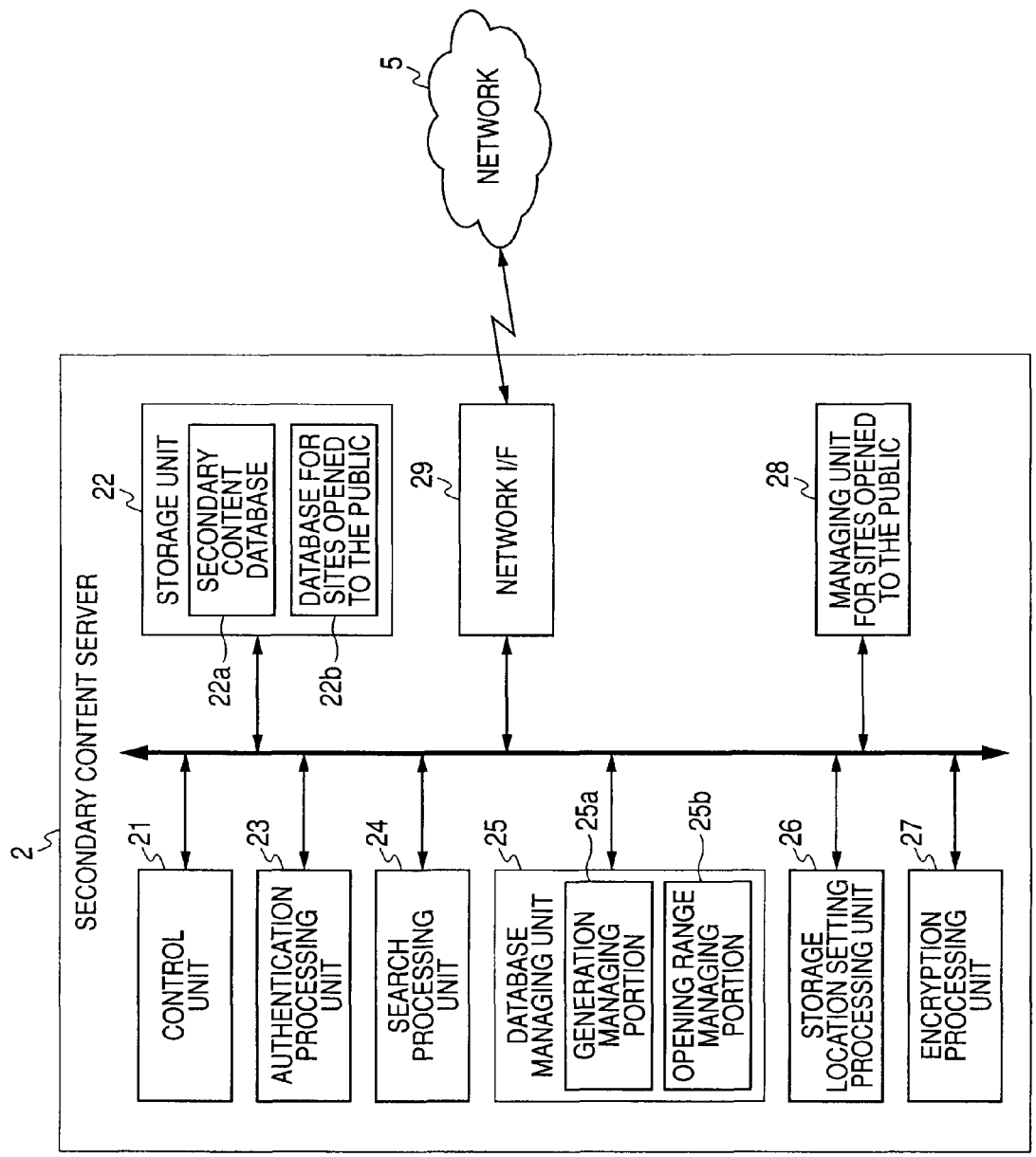
FIG. 7 is a view illustrating an example of the internal configuration of a secondary content server.

FIG. 7 illustrates an example of the internal configuration of the secondary content server 2. As shown in the drawing, the secondary content server 2 includes a control unit 21, a storage unit 22, an authentication processing unit 23, a search processing unit 24, a database managing unit 25, a storage location setting processing unit 26, an encryption processing unit 27, a managing unit 28 for sites opened to the public, and a network interface 29.

The control unit 21 is a unit that executes an overall control of various kinds of control processing in the secondary content server 2. The storage unit 22 is configured to include, for example, an HDD and stores various kinds of required data, information, and the like. In addition, the storage unit 22 may also be used as a region where, for example, a program executed by a CPU that forms the control unit 21 is stored in order to realize a function as the secondary content server 2. Here, a secondary content database 22a and a database 22b for sites opened to the public are shown as information stored in the storage unit 22.

The secondary content database 22a is an information unit in which the entire secondary contents (substantially, a secondary content reproduction control file) uploaded to the secondary content server 2 are compiled as a database. In addition, the database 22b for sites opened to the public is an information unit in which secondary contents, which are set to be opened to the public, among the entire secondary contents registered in the secondary content database 22a are registered in a database.

For example, when a request of downloading secondary contents is made, the authentication processing unit 23 executes required authentication processing for determining whether or not the user is a regular user by using a user ID or a password included in the request.

The search processing unit 24 is a unit that executes processing for searching desired secondary contents in collaboration with the database managing unit 25 by accessing the primary content database 22a. The database managing unit 25 performs management of the secondary content database 22a. For example, in the case when the secondary contents (secondary content reproduction control file) has been newly uploaded, the database managing unit 25 updates the secondary content database 22a by registering uploaded secondary contents. Similarly, in the case when secondary contents (secondary content reproduction control file) are deleted, deletion processing therefore and updating of database according to a result of the deletion are performed.

In addition, a generation managing portion 25a and an opening range managing portion 25b are shown herein as a part of functional units relevant to various kinds of database management assumed to be included in the database managing unit 25. The generation managing portion 25a is a portion for executing the management of a generation of secondary contents stored in the secondary content server 2. In addition, a concept of a generation of contents in the present embodiment, an example of generation managing processing executed by the generation managing portion 25a will be described later.

The secondary content server 2 in the present embodiment may perform setting for changing a mode (opening range) of opening on a network with respect to secondary contents stored as will be described later. The opening range managing portion 25b is a functional portion in charge of control and processing related to such opening range setting.

The encryption processing unit 27 is a unit that executes predetermined encryption processing on secondary content data which is to be transmitted from the secondary content server 2 to the user terminal apparatus 4. In addition, depending on system management, a case in which secondary content data is encrypted and transmitted from the user terminal apparatus 4 when the secondary contents are uploaded may be considered. In this case, the encryption processing unit 27 is configured to execute processing for decoding the encryption.

The managing unit 28 for sites opened to the public is a unit that executes various kinds of management processing for making the site opened to the public 2a properly operating by using the database 22b for sites opened to the public.

The network interface 29 is a unit for performing a communication through the network 5. For example, reception of uploaded secondary contents or a download request and transmission of secondary content data (secondary content reproduction control file) corresponding to the download request are realized when the network interface 29 executes communication processing according to the control of the control unit 21.

Figure 8:
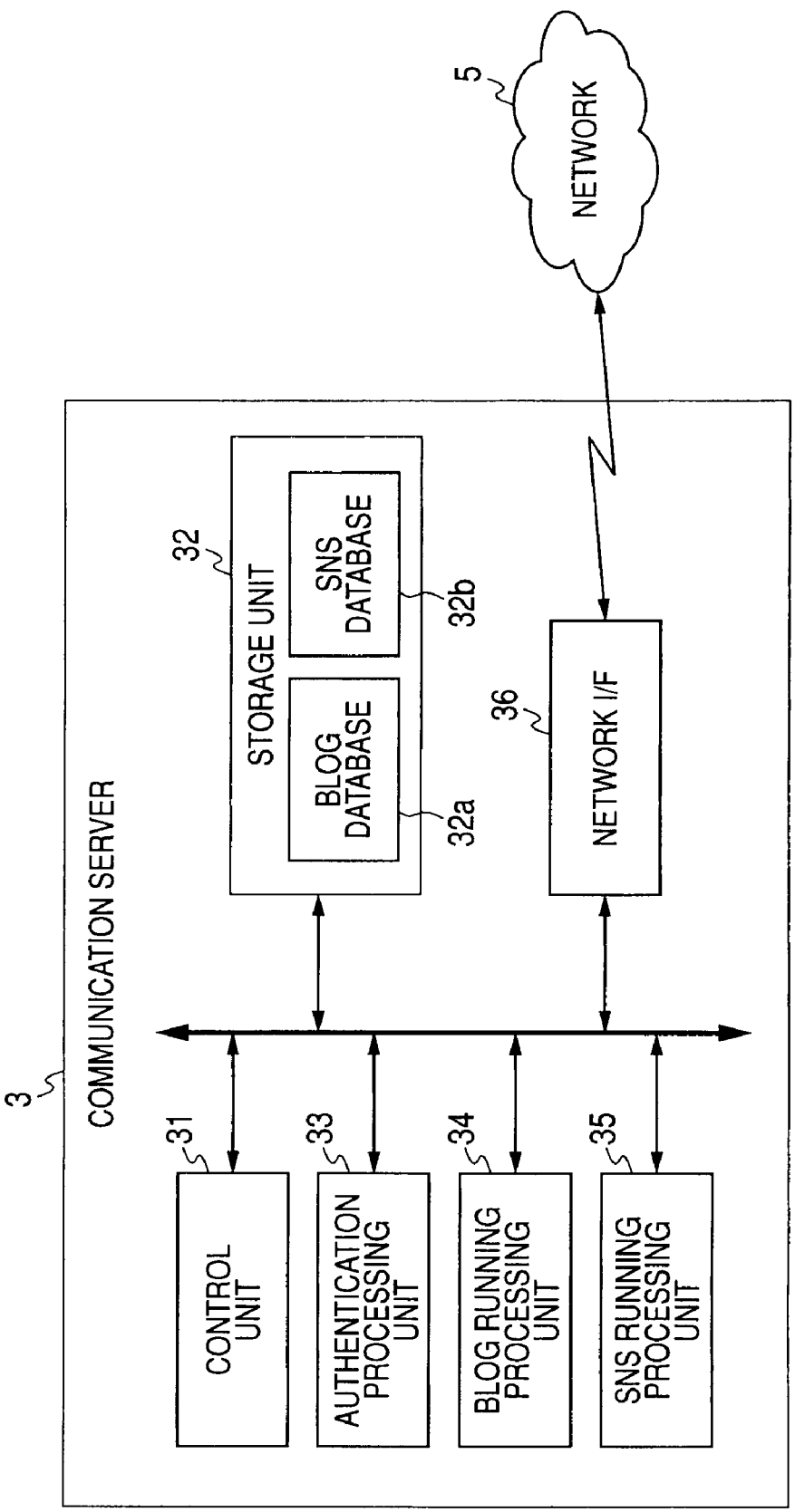
FIG. 8 is a view illustrating an example of the internal configuration of a communication server.

FIG. 8 illustrates an example of the internal configuration of the communication server 3. As shown in the drawing, the communication server 3 includes a control unit 31, a storage unit 32, an authentication processing unit 33, a blog running processing unit 34, an SNS running processing unit 35, and a network interface 36. In this case, the communication server 3 supplies a communication service of an SNS and a blog.

The control unit 31 is a unit that executes an overall control of various kinds of control processing in the communication server 3. The storage unit 32 is configured to include, for example, an HDD and stores a blog database 32a and an SNS database 32b therein. For example, the blog database 32a is an information unit in which data of a blog made by a user is compiled as a database. In addition, the SNS database 32b is an information unit in which page contents for every user of the SNS are compiled as a database.

In this case, the authentication processing unit 33 executes authentication processing using a user ID, a password, and the like included in the request in response to login for updating of a blog, a request of login to the SNS, and the like. If a result of the authentication processing is O.K., the login is successful.

The blog running processing unit 34 executes various kinds of required processing for properly running a blog. For example, the blog running processing unit 34 executes processing for transmission of data of a blog screen or transmission of a blog write screen in response to a request of access to a blog from the user terminal apparatus 4 or a request of a write screen of a regular blog. In addition, the blog running processing unit 34 executes processing for managing the blog database 32a, for example, updates blog database 32a such that writing to a blog is reflected.

Similarly, the SNS running processing unit 35 executes processing for properly running the SNS, for example, processing for transmitting data of corresponding page in response to a request of access to the page of the SNS or database management including update of the SNS database 32b for reflecting writing of a diary or the like.

The network interface 36 is a unit for performing a communication through the network 5. Thus, transmission of page data corresponding to the request of access to a blog or the SNS becomes possible. Here, the communication server 3 is provided corresponding to the SNS and a blog. However, different servers may be provided for the SNS and the blog. In addition, a CGM-related service allowing an individual user to distribute information, such as a site managed by an individual called a homepage that has been well known before the SNS and the blog appears, may also be provided in addition to the SNS and the blog.

Figure 9:
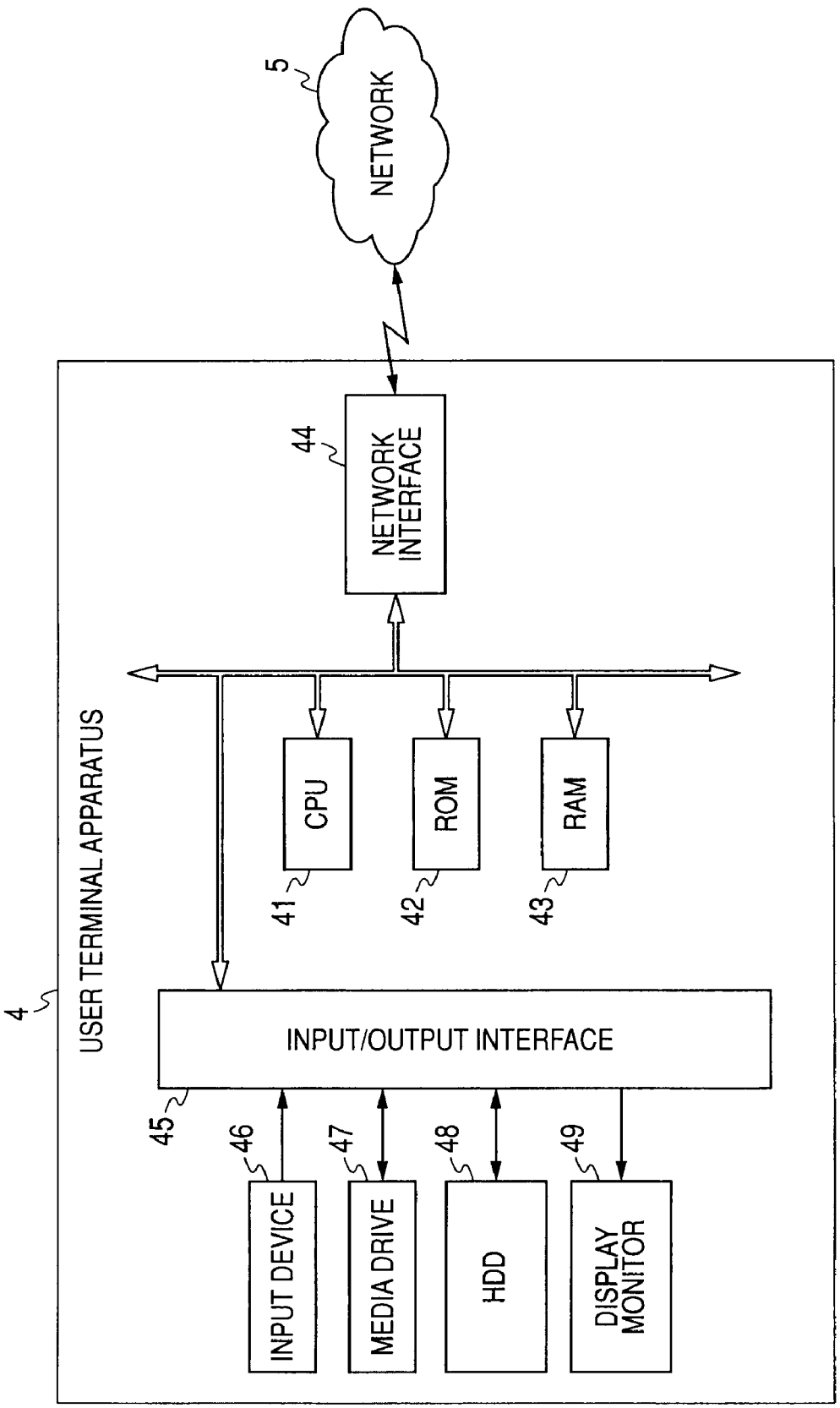
FIG. 9 is a view illustrating an example of the internal configuration of a user terminal apparatus.

FIG. 9 illustrates an example of the internal configuration of the user terminal apparatus 4. Furthermore, in this case, hardware as the user terminal apparatus 4 is assumed to be a personal computer. First, the user terminal apparatus 4 includes a network interface 44 used to perform a communication through a network 5. Since the network interface 44 is provided, the user terminal apparatus 4 may communicate with the primary content server 1, the secondary content server 2, the communication server 3, and the other user terminal apparatuses 4, for example, through the network 5.

A CPU (central processing unit) 41 can execute various kinds of processing according to an OS (operating system) installed in an HDD (hard disk drive) 48, various kinds of application programs, and a program stored in a ROM 42. In the present embodiment, an application program as the music editing and sharing application 100 is installed. A RAM 43 is a working area for the CPU 41. Data, programs, and the like required for the CPU 41 to execute various kinds of processing are appropriately stored in the RAM 43.

In this case, an input device 46, such as a keyboard or a mouse, is connected to an input/output interface 45 and an operation signal output from the input device 46 is converted into a signal adapted to the CPU 41 and is output to the CPU 41. In addition, a media drive 47 is connected to the input/output interface 45. The media drive 47 is a drive device configured such that record and reproduction of data in removable media having a predetermined format is possible.

In addition, an HDD 48 provided with a hard disk as a storage medium is connected to the input/output interface 45. The CPU 41 can perform recording or reading of data or a program with respect to a hard disk of the hard disk drive 48 through the input/output interface 45. In addition, a display monitor 49 for image display is also connected to the input/output interface 45.

Figure 10:
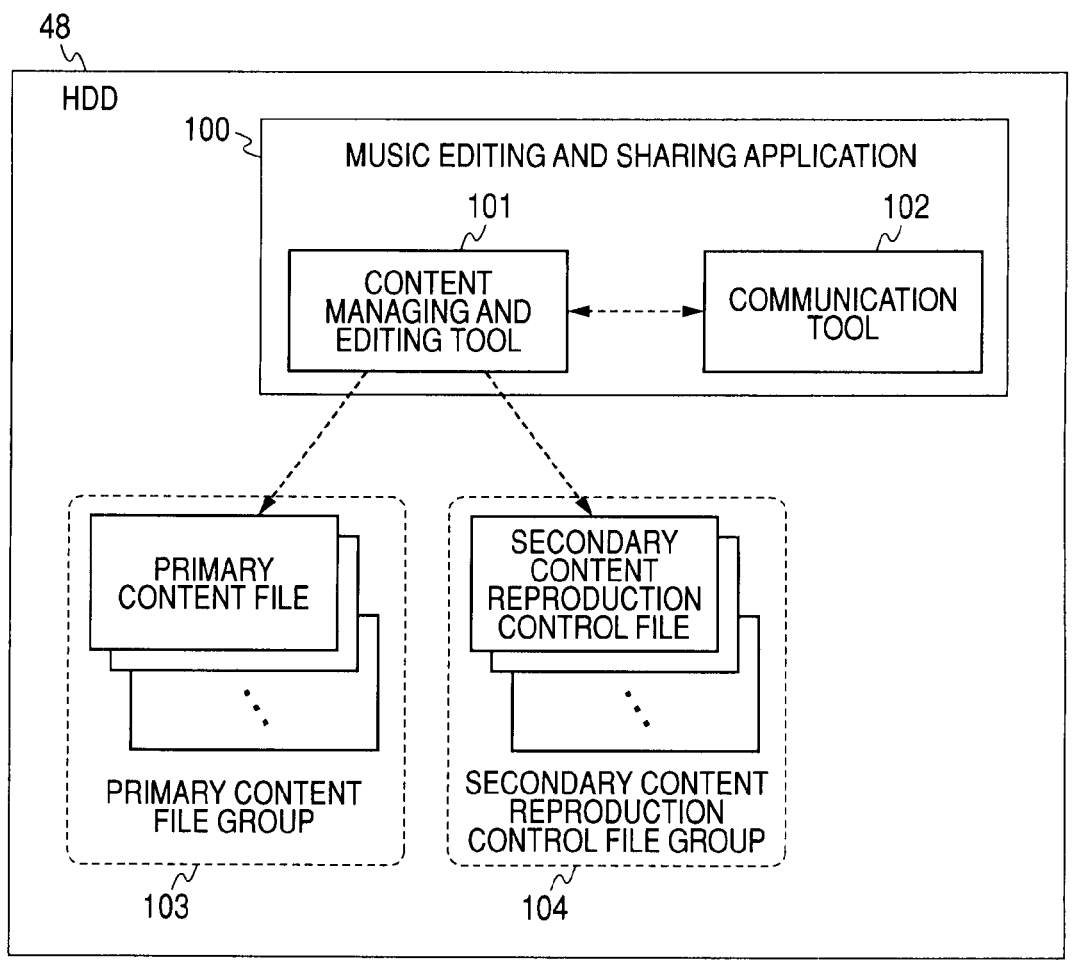
FIG. 10 is a view illustrating an example of information contents to be stored in an HDD of a user terminal apparatus.

FIG. 10 illustrates an example of content of data stored in the HDD 48 in connection with the use of the music editing and sharing system according to the present embodiment. As shown in the drawing, for the music editing and sharing system according to the present embodiment, the music editing and sharing application 100 is first stored as data of an application program. In addition, storage of the music editing and sharing application 100 into the HDD 48 is performed by installation processing. In addition, one or more primary content files (primary content file group 103) and one or more secondary content reproduction control files (secondary content reproduction control file group 104) are stored as application files by control of the music editing and sharing application 100.

In this case, the music editing and sharing application 100 may be largely divided into a program portion serving as a content managing and editing tool 101 and a program portion serving as a communication tool 102 from a functional point of view. The content managing and editing tool 101 executes downloading of a primary content file (which is configured to include audio data and metadata) or a secondary content reproduction control file and a file operation with respect to a primary content file of the primary content file group 103 and a secondary content reproduction control file of the secondary content reproduction control file group 104. In addition, the content managing and editing tool 101 also executes editing processing corresponding to an editing operation, processing for creating a secondary content reproduction control file corresponding to an editing result, and the like. The communication tool 102 executes processing for operating a blog or the SNS by accessing the communication server 3.

Figure 11:
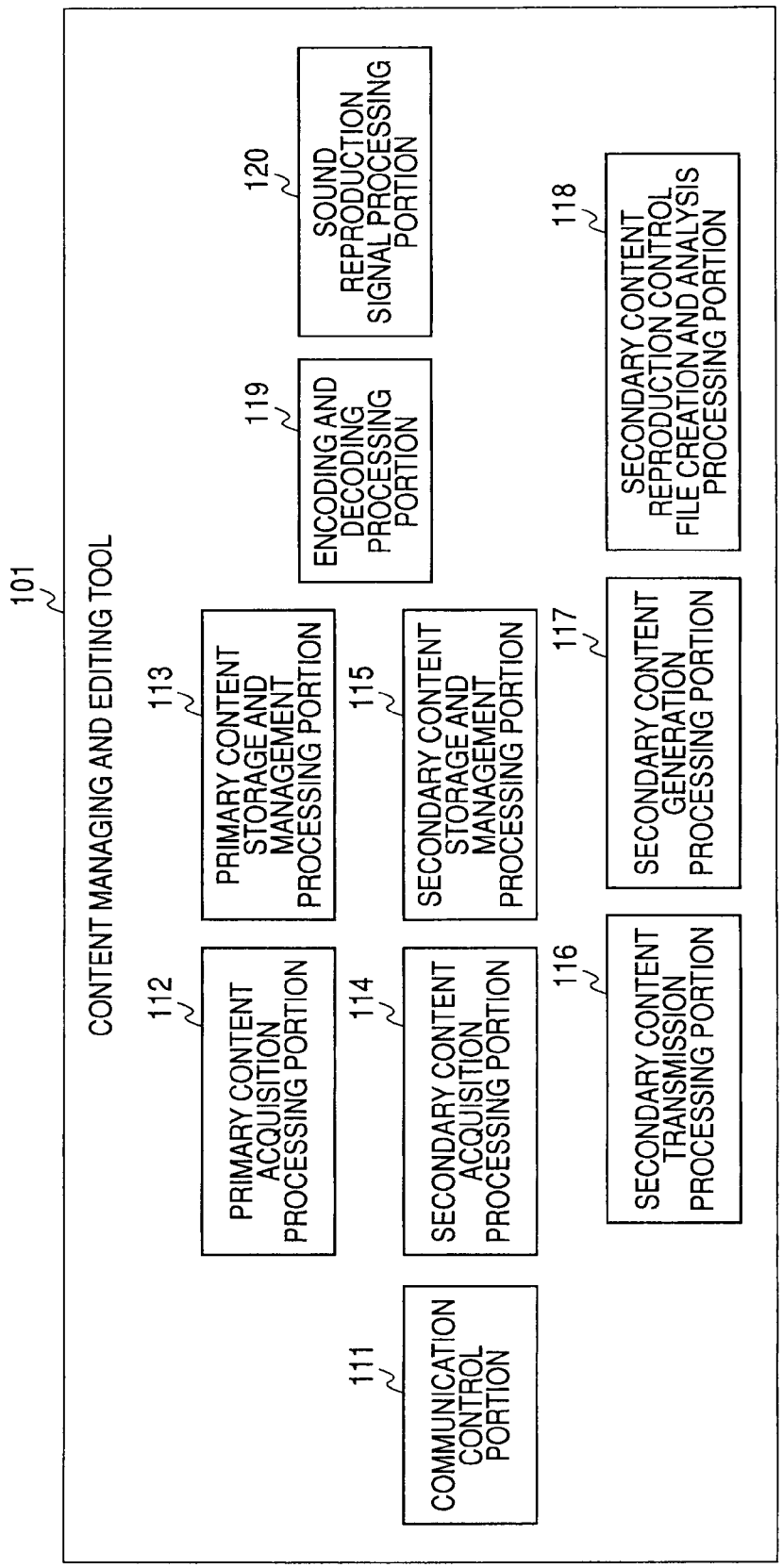
FIG. 11 is a view illustrating an example of the configuration of a program as a content editing and managing tool of the music editing and sharing application by using functional blocks.

FIG. 11 is a view schematically illustrating the program configuration of the content managing and editing tool 101 in a functional block unit. As shown in the drawing, the program configuration includes a communication control portion 111, a primary content acquisition processing portion 112, a primary content storage and management processing portion 113, a secondary content acquisition processing portion 114, a secondary content storage and management processing portion 115, a secondary content transmission processing portion 116, a secondary content reproduction control file generation and analysis processing portion 117, a secondary contents editing and creation processing portion 118, an encoding and decoding processing portion 119, and a sound reproduction signal processing portion 120.

The communication control portion 111 is a portion configured to include a program required to execute a communication with the primary content server 1 or the secondary communication server 3 through a network mainly in association with managing and editing of contents.

The primary content acquisition processing portion 112 is a portion configured to include a program required to download and acquire primary contents. User interface for downloading the primary contents is provided by the primary content acquisition processing portion 112. In addition, a control of issuing a command as a download request and transmitting the command through the communication control portion 111 or processing for receiving a packet of data of the primary contents received through the communication control portion 111 and restoring the packet in a data format as the primary contents is also executed by the primary content acquisition processing portion 112.

The primary content storage and management processing portion 113 is a portion that executes processing for storing a primary content file, which has been acquired by the primary content acquisition processing portion 112, in the HDD 48, and processing for managing the stored primary content file. For example, music management, such assorting according to an artist name, an album unit, a genre, and the like, is realized by the primary content storage and management processing portion 113.

The secondary content acquisition processing portion 114 is a portion configured to include a program required to download and acquire secondary contents. The secondary content storage and management processing portion 115 is a portion that executes processing for storing a secondary content reproduction control file, which has been acquired by the secondary content acquisition processing portion 114, in the HDD 48, and processing for managing the stored secondary content reproduction control file.

The secondary content transmission processing portion 116 executes processing for making transmission processing for uploading the secondary content reproduction control file to the secondary content server 2 properly executed through the communication control portion 111.

The secondary content generation processing portion 117 is a portion that executes editing using editing material contents shown in FIG. 3, that is, processing related with creation of music contents as secondary contents. For example, a user interface for an editing operation and the like is realized by the secondary content generation processing portion 117. The secondary content reproduction control file creation and analysis processing portion 118 first executes processing for generating a secondary content reproduction control file in which music contents as the secondary contents created by the secondary content generation processing portion 117 are reflected. In the case of reproducing the secondary contents, a sequence of regeneration processing using editing material contents is determined by executing analysis processing on the secondary content reproduction control file shown in FIG. 4.

In the present embodiment, a primary content file is encoded and is then transmitted from the primary content server 1. In addition, the secondary content reproduction control file may also be encoded to be transmitted when the secondary content reproduction control file is transmitted from the secondary content server 2 to the user terminal apparatus 4 in response to download. Also, when the secondary content reproduction control file is uploaded from the user terminal apparatus 4 to the secondary content server 2, the secondary content reproduction control file may be encoded and then transmitted. The encoding and decoding processing portion 119 executes processing for decoding the encryption when an operation for reproduction, editing, and the like of the encoded primary content file and the encoded secondary content reproduction control file is required. In addition, the encoding and decoding processing portion 119 executes encryption when a secondary content reproduction control file needs to be encoded and transmitted.

The sound reproduction signal processing portion 120 is a portion for executing signal processing, which is required to be performed in a digital phase, among signal processing processes for reproducing digital audio data as sound. For example, if compression encoding for the primary content file is already done when reproducing a primary content file, the sound reproduction signal processing portion 120 performs decoding processing corresponding to the compression encoding, for example, such that a digital audio signal based on a predetermined PCM format is acquired. In addition, in the case of reproducing the secondary contents, the sound reproduction signal processing portion 120 executes reproduction processing as a sequencer which reproduces a data portion of the primary content file as editing material contents according to sequences of reproduction processing determined by the secondary content reproduction control file creation and analysis processing portion 118.

Here, a result obtained by analyzing reproduction control information by means of the secondary content reproduction control file creation and analysis processing portion 118 in reproducing the secondary contents may be reflected on an editing work screen, which is a GUI provided by the secondary content generation processing portion 117. That is, details of a reproduction instruction indicated by the reproduction control information are displayed on the editing work screen so as to be recognizable by a user. The user can check how the secondary contents have been created by viewing the screen. This means that it can be obtained as accurate information how the secondary contents have been created by the creator. For example, in the case of contents based on a digital audio signal, in order for a normal user to know how the contents were created, there is no choice but to guess it from acoustic contents after actually reproducing and listening to the contents. In this manner, in the present embodiment, it is possible to see how the secondary contents have been created in more details and more specifically. In addition, by causing such secondary contents to be shared among users, it is expected that knowledge and technique regarding user's musical work using the user using music editing and sharing system according to the present embodiment will be noticeably improved. Thus, the system according to the present embodiment provides very high entertainment and has a very high value of use for a user interested in a musical work.

Figure 12:
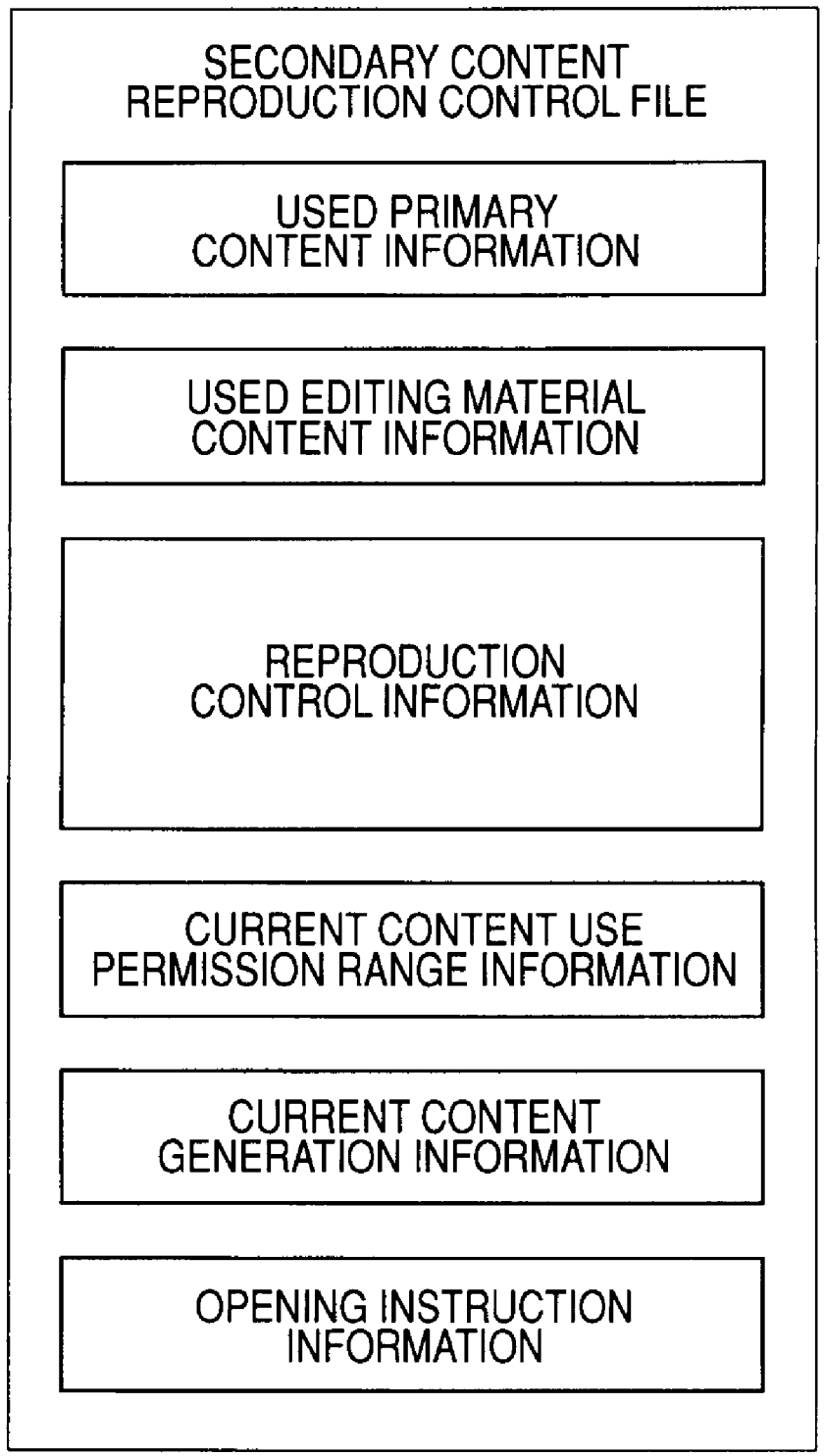
FIG. 12 is a view schematically illustrating an example of the structure of a secondary content reproduction control file.

Next, an example of the structure of a secondary content reproduction control file will be described with reference to FIG. 12. As shown in the drawing, the secondary content reproduction control file includes information portions of at least used primary content information, used editing material content information, reproduction control information, current content use permission range information, and current content generation information. The secondary content reproduction control file is formed by storing those information portions in a predetermined structure therein. Among the information portions, the reproduction control information is main information (body information) as a secondary content reproduction control file, and the other information (used primary content information, used editing material content information, current content use permission range information, current content generation information, and opening instruction information) are metadata (additional information).

The used primary content information is information indicating which are the primary contents (this is used primary contents) required for reproducing music contents as secondary contents to which a current secondary content reproduction control file corresponds. In other words, the used primary content information is information indicating which are the primary contents used as a result in order to create the current secondary contents. Referring to FIGS. 5A to 5C, information indicating primary contents shown as forming secondary contents newly created by editing processing is the used primary content information. That is, as the used primary content information, primary contents A and B are shown in the case shown in FIG. 5A, primary contents A, C, and D are shown in the case shown in FIG. 5B, and primary contents C, D, E, and F are shown in the case shown in FIG. 5C.

In addition, there is a possibility that predetermined primary contents included in editing material contents will be deleted from music contents as the secondary contents created by editing the editing material contents. For example, in the case shown in FIG. 5B, it may be possible to consider a possibility of music contents in which, for example, the primary contents A and C are used as sound sources but an element of a primary content D is not used as new secondary contents obtained by performing editing using the editing material contents A and B. In this case, only the primary contents A and C are required as audio data of primary contents required for reproduction of the secondary contents, but the primary content D is not required. It is arbitrary which kind of contents are to be contents of used primary content information corresponding to such a case. As one example, only the primary contents A and C are shown but the primary contents D are not presented on the basis of an idea that only primary contents, which are actually required for reproduction of secondary contents, are reflected. As another example, all primary contents of the primary contents A, C, and D may be shown. That is, in this case, although the primary contents D are not actually used, an effect of the primary contents D as music contents is large. This case is based on an idea that the primary contents D are used latently. In this case, as a result, all primary contents, which have been used once or more up to generations in which current secondary contents are created, are included in used primary content information. In addition, the used primary content information also includes metadata of predetermined contents regarding every primary content shown here.

In addition, the used editing material content information is information indicating which editing material contents (used editing material contents) have been directly used to create secondary contents to which the current secondary content reproduction control file corresponds. Referring to examples shown in FIGS. 5A to 5C, information indicating an actual primary content file as editing material contents A and B is shown in the used editing material content information on the secondary contents after the editing processing shown in FIG. 5A. In addition, a primary content file configured to include the editing material contents A and information indicating secondary contents (secondary content reproduction control file) configured to include the editing material contents C are stored in the used editing material content information after editing processing shown in FIG. 5B. In addition, the used editing material content information also includes additional information of predetermined contents regarding every editing material contents shown here.

Reproduction control information is an information portion in which processing sequences for reproducing music contents as current secondary contents are described in a predetermined language. For example, elements of description contents that form there production control information include description indicating primary contents as actual audio data used for reproduction, description indicating a data portion of audio data as the primary contents which is actually used for reproduction of the secondary contents, and description indicating a period of time for which the data portion is reproduced. In addition, description for reflection of so-called effects and special effect starting from fade-in, fade-out, overlap, equalizing (tone adjustment), reproduction speed magnification, revival, delay, and the like is also performed.

The current content use permission range information is information on a use permission range set in the current secondary contents (current contents). It is preferable that this structure is based on use permission range information in a structure example of use contents to be described later with reference to FIG. 13.

The current content generation information is information indicating to which generation the current secondary contents correspond as contents created by the music editing and sharing system according to the present embodiment. In addition, setting of generation of contents in the system in the present embodiment will be described later.

The opening instruction information is information indicating details of a condition (opening condition) on which kind of mode is used in opening when opening the current secondary contents by uploading the current secondary contents to the secondary content server 2. The structure example of the opening instruction information will be described later.

FIG. 13 illustrates examples of structures of the used primary content information and the used editing material content information. As shown in the drawing, the used primary content information and used editing material content information are largely obtained by connection of unit file information. Each of the unit file information corresponds to one used primary content and one used editing material content. In addition, in the case where the used primary contents and the used editing material contents are not particularly distinguished in description with reference to FIG. 13, the used primary contents and the used editing material contents are assumed to be "use contents" for the convenience of explanation.

In unit file information, for example, a file ID, an artist name, a song title, and various information items of use permission range information are set. As the file ID is an identifier (ID) assigned so as to be unique to a content file of corresponding use contents. That is, a file ID as a primary content file which is use contents or a file ID as a secondary content reproduction control file which is use contents is stored. In addition, these file IDs are given by the primary content server 1 in the case of used primary contents and are given by the secondary content server 2 in the case of a secondary content reproduction control file. The information item of an artist name indicates a name of a player or a creator who has performed or created the corresponding use contents. The information item of a song title indicates a song title of corresponding use contents.

In the information item of generation, generation information is stored. The generation information is information indicating to which generation the contents corresponds. In the music editing and sharing system according to the present embodiment, the primary contents are primarily defined as a first generation, as will be described later, and the secondary contents are defined as an N generation on the basis of a predetermined rule according to the generation of editing material contents. Therefore, in the case where the use content information shown in FIG. 12 is the used primary content information, information indicating a first generation is stored in the item of the generation information. In addition, in the case where the use content information shown in FIG. 12 is the editing material content information, information indicating a generation, which is actually set corresponding to every use contents (primary contents or the secondary contents) to which unit file information corresponds, is stored.

The information (use permission range information) on a use permission range is formed by a group of one or more use items 1 to n. Predetermined use contents relevant to editing (secondary use) of corresponding use contents are assigned so as to correspond to the use items 1 to n. Various examples may be considered as examples of use contents assigned to use items. For example, contents on whether or not current contents can be secondarily used, contents regarding using contents of an artist different from the current contents for other contents used as editing materials, contents regarding using contents belonging to an album different from an album, to which the current contents belong, for other contents used as editing materials, contents regarding use of a specific effect or a special effect, contents regarding use of a specific plug-in module, contents regarding extracting a portion from the entire song and using the portion as an editing material, contents of permission regarding an audio data portion extracted in the case where a portion is extracted from the entire song and the portion is used as an editing material, the number of generations available (for example, in the case when a generation up to a grandchild generation is permitted to use primary contents, secondary contents of a child using the primary contents and secondary contents of a grandchild using the secondary contents can be created, but it is not possible to edit a portion using corresponding use contents in the secondary contents of the grandchild, contents regarding the number and types of contents that can be secondarily used in combination with the current contents, and the like may be mentioned. In addition, information indicating contents regarding use permission set for every use item, for example, starting from permission/no permission is described in each of the use items. The use permission range information indicates a use permission range of corresponding use contents by summarizing set contents of permission described in each of the use items.

Figures 14, 15:
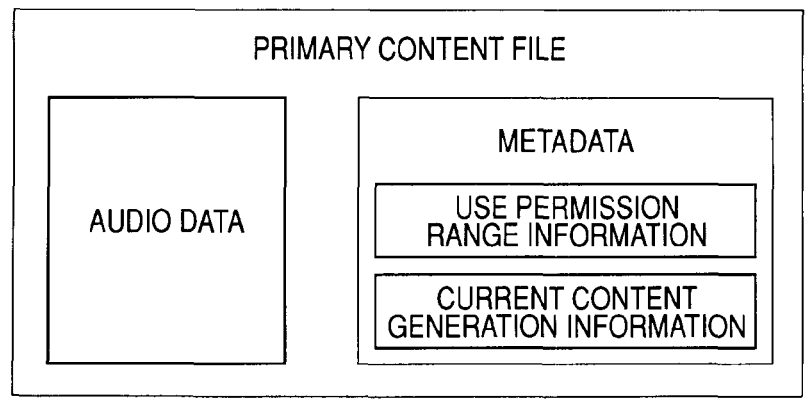
FIG. 14 is a view illustrating an example of contents of reproduction control information in a secondary content reproduction control file.
FIG. 15 is a view schematically illustrating an example of the structure of a primary content file.

FIG. 14 illustrates an example of contents of reproduction control information in a secondary content reproduction control file. In this drawing, a description portion put in [ ] indicates predetermined one reproduction control content about one use content. An example of the reproduction control contents in the unit of use contents shown in FIG. 14 will now be described. First, [file_id=AAAAAA; time=00:00-00:10; position=vv-zz] is described as the reproduction control contents in the unit of use contents, which is shown in a head in the drawing. This indicates that use contents are designated by a file ID=AAAAAA, a reproduction time of current secondary contents using the use contents is 00:00 (start point of time) to 00:10 (reproduction time 10 seconds), and a data section of the use contents used for the reproduction time is a range corresponding to addresses vv to zz. Subsequent to the above, [file_id=AAAAAA; time=00:00-00:15; position=ss-tt] is described as reproduction control contents in the unit of use contents. This indicates that use contents are designated by a file ID=AAAAAA, a reproduction time of current secondary contents using the use contents is 00:10 to 00:15, and a data section of the use contents used for the reproduction time is a range corresponding to addresses ss to tt. Subsequent to the above, [file_id=BBBBBB; time=00:15-00:20; position=pp-uu] is described as reproduction control contents in the unit of use contents. This indicates that use contents are designated by a file ID=BBBBBB, a reproduction time of current secondary contents using the use contents is 00:15-00:20, and a data section of the use contents used for the reproduction time is a range corresponding to addresses pp to uu. For example, the sound reproduction signal processing portion 120 of the music editing and sharing application 100 in the present embodiment reproduces and outputs secondary contents as a sound signal by sequentially analyzing reproduction control contents in the unit of use contents put in [ ] as described above and actually executing a reproduction control according to a result of the analysis.

In addition, the structure of a primary content file will be described. As already described above, the primary content file has a file structure configured to include audio data, which is based on a predetermined format and has music contents as primary contents, and various kinds of metadata related to the audio data, which is shown in FIG. 15. In addition, predetermined sound compression encoding may be performed in the case of audio data. In this case, the storage capacity of the primary content server 1 for storing primary contents may be saved by performing the sound compression encoding to thereby reduce the data size, which is also advantageous in transmission on a network. In addition, types of metadata forming the metadata group described above includes use permission range information and current content generation information in addition to information generally added to audio data, such as a song title, an artist, and title, genre, data format, data size, and the like of a corresponding album.

The use permission range information is set to have the same meaning as the unit file information shown in FIG. 13, for example. That is, although the primary contents are permitted to be secondarily used in the present embodiment, permission of the use is obtained by approval of a copyright holder (for example, an artist) of the primary contents. In addition, contents, a range, and the like of the use that a copyright holder can permit change naturally according to a copyright holder's view over a song. Therefore, in the present embodiment, information in which a use permission range is set is included as metadata in order to respect such copyright holder's view, such that a copyright holder's intention is reflected. Here, it may be considered to uniformly set use permission ranges of all primary contents as an application method. However, in order to operate the music editing and sharing system more smoothly, it is effective to make the copyright holder's intention reflected by allowing different use permission ranges to be set for every primary contents in the same manner as in the present embodiment. In addition, contents of use items that form information on a use permission range in metadata of a primary content file do not need to be equal to the secondary content reproduction control file shown in FIG. 13, but it is preferable that contents of use items needed as primary contents be set.

In addition, the current content generation information, which is metadata in the same primary content file, is information indicating to which generation the contents created by the music editing and sharing system according to the present embodiment correspond. As already described above, since the primary contents are defined as a first generation, information indicating the first generation is stored in the current content generation information within the primary content file. However, since the primary contents are uniformly defined as the first generation, a structure in which the current content generation information is deleted from the primary content file may also be considered. However, for example, when secondary contents have been newly created, it is preferable to make the current content generation information included even in the primary content file in the case of an algorithm in which current content generation information included as metadata in editing material contents is used when checking a generation corresponding to the secondary contents. In this way, it becomes possible to check the generation of the new secondary contents with the same algorithm only by referring to the current content generation information regardless of primary contents and secondary contents.

Figure 16:
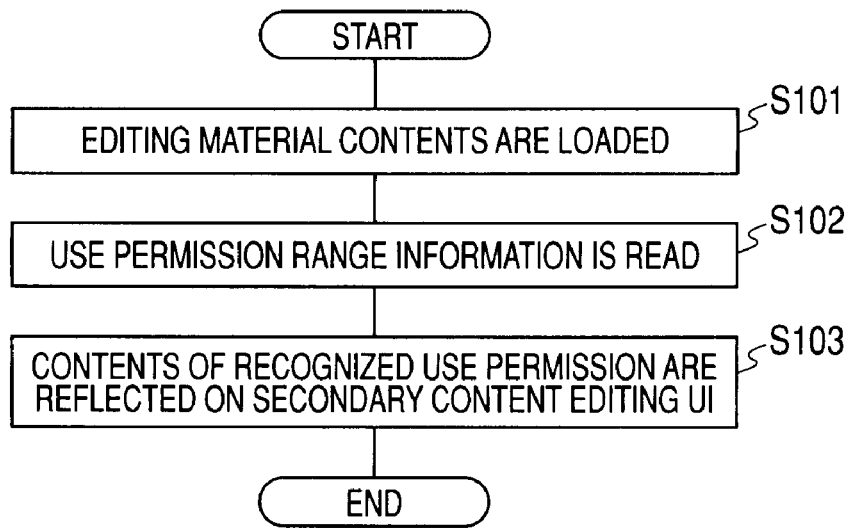
FIG. 16 is a flow chart illustrating an example of processing procedures for making use permission range setting of editing material contents reflected in a UI (user interface) when a music editing and sharing application performs secondary contents editing processing.

Next, an example of procedures regarding main processing of editing of secondary contents will be described with reference to a flow chart shown in FIGS. 16 and 17. In addition, the processing shown in FIGS. 16 and 17 is realized by executing a program as the content managing and editing tool 101 in the music editing and sharing application 100.

Here, for example, a user of the user terminal apparatus 4 is assumed to edit secondary contents by running the content managing and editing tool 101 of the music editing and sharing application 100. In addition, the user performs an operation of searching contents used as materials for creation of the secondary contents and of registering (determining) the contents as editing material contents. As a result, processing shown in FIG. 16 is executed by the secondary content generation processing portion 117 in the content managing and editing tool 101. Referring to FIG. 16, first, in step S101, loading of data of contents registered as editing material contents is executed. For clear understanding of explanation, data of a file as primary contents is loaded when the registered editing material contents are primary contents, and data of a secondary content reproduction control file corresponding to secondary contents is loaded when the registered editing material contents are the secondary contents.

In step S102, it is further performed to read information on a use permission range from the data loaded in step S101. Thus, contents about various kinds of use permission set for contents registered as editing material contents this time are recognized on the basis of contents of the use items 1 to n in use permission range information. Then, in step S103, setting is made such that the contents of use permission recognized in step S102 are reflected in a user interface (UI) for editing of the secondary contents. By this processing, it becomes difficult to perform an operation of editing contents which is not permitted by a use permission range set as editing material contents beforehand. Accordingly, an operation of the secondary content generation processing portion 117 is obtained.

Figure 17:
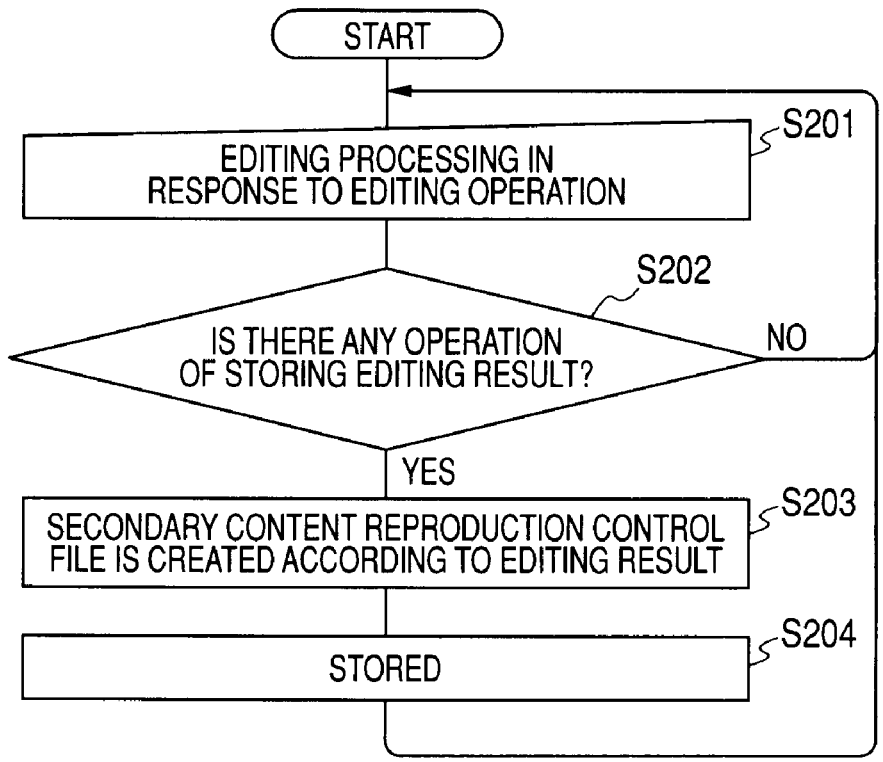
FIG. 17 is a flow chart illustrating an example of processing procedures until a music editing and sharing application creates a secondary content reproduction control file as secondary content editing processing.

FIG. 17 illustrates an example of procedures concerning creation of a secondary content reproduction control file that is actual data as secondary contents. The processing shown in the drawing is also realized by causing the CPU 41 to execute a program as the content managing and editing tool 101. Here, first, in step S201, appropriate editing processing is executed in response to an operation input for editing. For example, the secondary content generation processing portion 117 provides a GUI, which allows a user to perform an editing operation for creating secondary contents, through the program. The user performs an editing operation for creation of secondary contents by using the GUI (graphical user interface), and processing according to the operation is executed in step S201. Then, if it is determined that an operation for storing a result of editing performed up to now has been executed in step S202 while the editing processing is being performed as described above, the process proceeds to step S203. In step S203, a secondary content reproduction control file corresponding to music contents as secondary contents obtained as a result of editing performed up to now is generated. Then, in step S204, a control is executed such that the secondary content reproduction control file is stored in an appropriate directory in the HDD 48. If a procedure of step S204 ends, the process returns to step S201. In addition, although not shown here, escape from the processing shown in the drawing is performed according to an operation performed to close a GUI screen for creation of the secondary contents, for example, thereby proceeding to another required processing. In addition, contents of current content use permission range information are created when creating the secondary content reproduction control file. Regarding how to set the contents of the content use permission range information, it is considered to automatically set the contents (contents for each use item) on the basis of a predetermined rule and in a range not exceeding a minimum decided by summarizing use permission range information of primary contents that are original editing materials. In addition, it may also be considered to set the contents according to a designation operation regarding contents of the current content use permission range information supposed that the user has performed such that the intention of the user is reflected. However, even in the case when setting is thus made according to a user's operation, the setting is performed in a range not exceeding the minimum decided by summarizing the use permission range information of the primary contents that are original editing materials, and setting in a use permission range (contents for each use item) exceeding the range is not performed.

Figure 18:
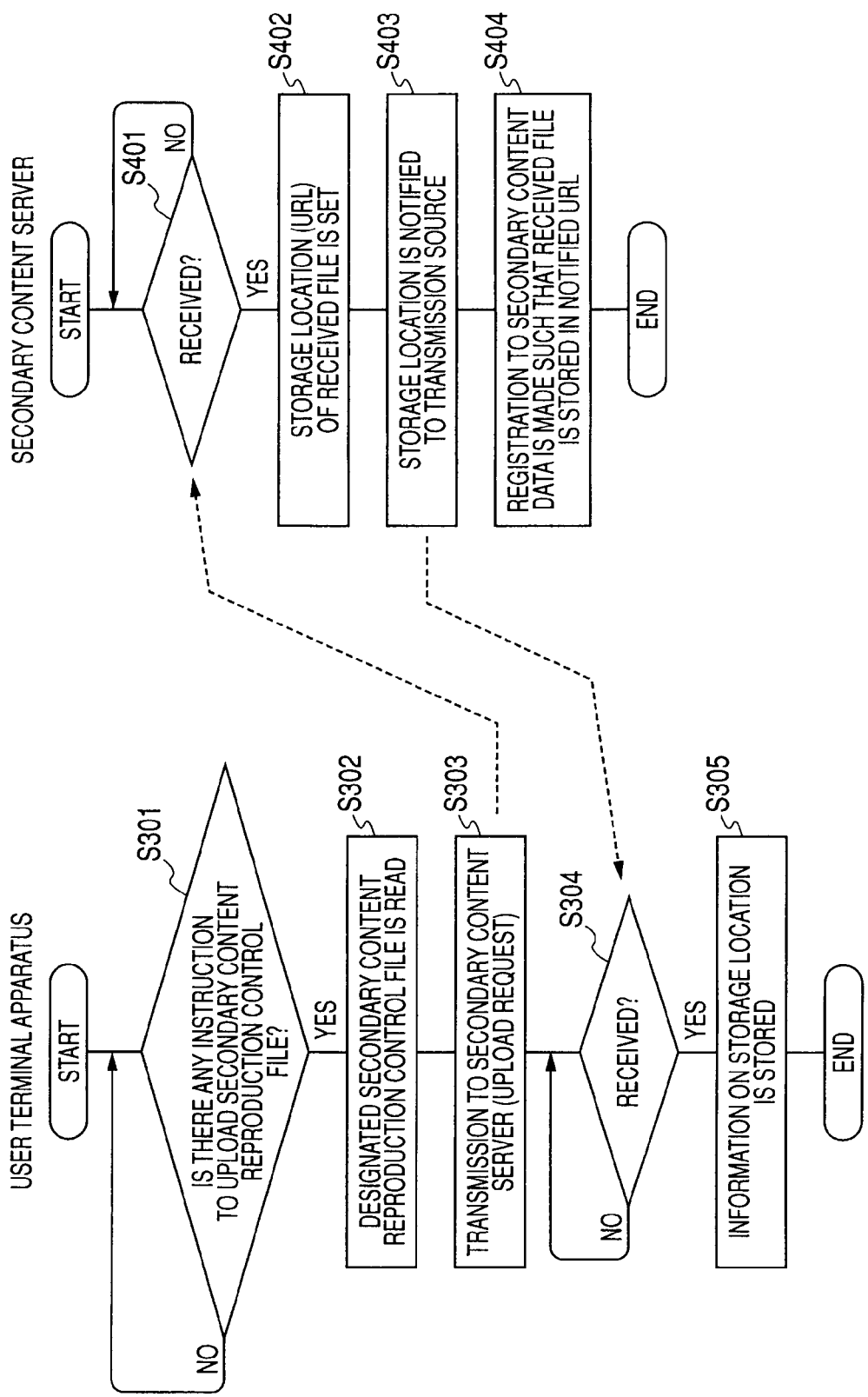
FIG. 18 is a flow chart illustrating uploading of secondary contents performed by a user terminal apparatus and an example of processing procedures of a secondary content server according to the upload.

Subsequently, an example of processing procedures regarding upload of secondary contents using the user terminal apparatus 4 and an example of processing procedures of the secondary content server 2 corresponding to the upload will be described with reference to a flow chart shown in FIG. 18. Processing at a side of the user terminal apparatus 4 in this drawing is realized by a program mainly as the secondary content storage and management processing portion 115 and the secondary content transmission processing portion 116. Although processing of the secondary content server 2 is executed in collaboration with the respective units shown in FIG. 7, in actuality, it can be seen that the processing of the secondary content server 2 is realized when a computer system (CPU) that forms the secondary content server 2 executes a program, for example.

The user terminal apparatus 4 waits until a command instructing upload of a secondary content reproduction control file is obtained in step S301. Here, for example, as an operation related to the GUI provided by the content managing and editing tool 101, the user selects one or more secondary contents that the user wants to upload from secondary contents (that is, the secondary content reproduction control file), which are stored as an application file of the music editing and sharing application 100 in the HDD 48 and which are created by the music editing and sharing application 100, and performs an operation for upload execution. According to the above operation, a command instructing upload of the secondary content reproduction control file corresponding to the secondary contents selected on the GUI is generated, and the process proceeds to step S302.

In step S302, the secondary contents upload of which is designated, that is, the secondary content reproduction control file is read from a predetermined directory. Then, in step S303, a control of transmitting and outputting the secondary content reproduction control file, which has been read, to the secondary content server 2 through a network together with an upload request is executed.

The secondary content server 2 waits until the upload request is received in step S401. When the upload request is received, procedures starting from step S402 are executed. In addition, in order to actually proceed to step S402 after receiving the upload request, it is confirmed, for example, through authentication processing whether or not the upload request is a request from a regular user. However, such a processing procedure is herein omitted. In step S402, a storage location (URL) of the secondary content reproduction control file received together with the upload request is set. In step S403, communications processing for notifying the user terminal apparatus 4, which is a transmission source of the current upload request, of the storage location of the uploaded secondary contents (secondary content reproduction control file) is executed.

The user terminal apparatus 4 which has performed the upload request in step S303 waits until information on the storage location is received in step S304. Then, when the information on the storage location is received, the received information on the storage location (URL) is stored in an appropriate directory in step S305. Accordingly, the information on the storage location of the secondary contents can be recalled later by performing a predetermined operation on the content managing and editing tool 101. If a storage location is a URL, for example, a character string as a URL is displayed depending on a call operation.

Figure 19:
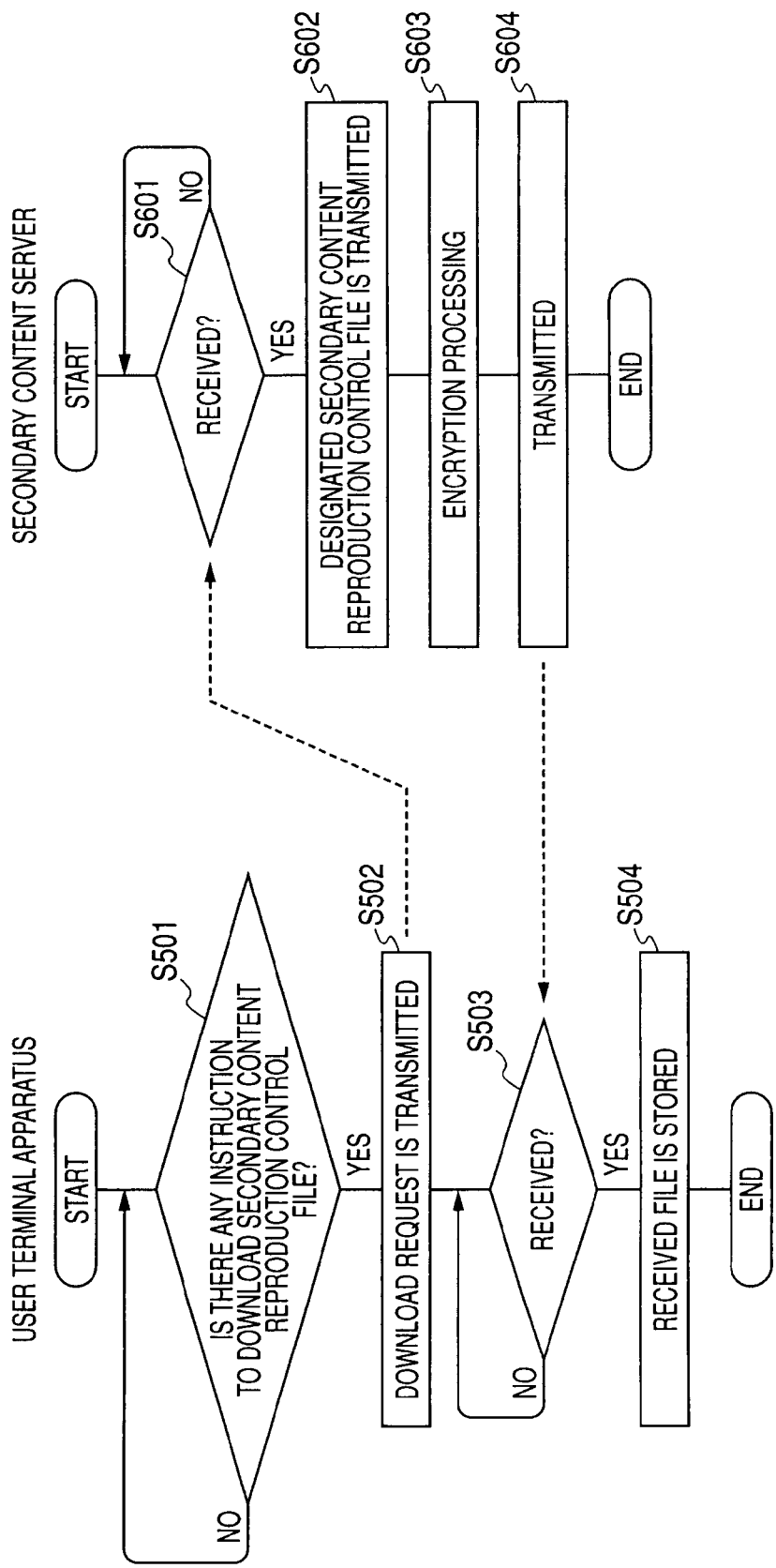
FIG. 19 is a flow chart illustrating downloading of secondary contents performed by a user terminal apparatus and an example of processing procedures of a secondary content server according to the download.

A flow chart shown in FIG. 19 illustrates an example of processing procedures regarding download of secondary contents using the user terminal apparatus 4 and an example of processing procedures of the secondary content server 2 corresponding to the download. Processing at a side of the user terminal apparatus 4 in this drawing is also realized by a program mainly as the secondary content storage and management processing portion 115 and the secondary content transmission processing portion 116. First, the user terminal apparatus 4 waits until a command instructing download of a secondary content reproduction control file is obtained in step S501. Here, for example, as an operation related to the GUI provided by the content managing and editing tool 101, the user selects one or more secondary contents that the user wants to download in a state in which the user accesses the secondary content server 2 and views a list of secondary contents stored and managed in the secondary content server 2 and then performs an operation for download execution. As a result, a positive determination result is obtained in step S501, and then the process proceeds to step S502.

In step S502, a download request is transmitted to the secondary content server 2 in response to a download instruction that has been obtained. In addition, for example, information designating a directory (storage location) of secondary contents selected at the time of an operation of download execution instruction is also included as the download request. In addition, it may also be considered to adopt a structure of performing a download request by designating a file ID of a secondary content reproduction control file, which is the substantial body of the secondary contents, instead of the storage location.

The secondary content server 2 waits until the download request is received in step S601. When the download request is received, a procedure in step S602 is executed. In addition, even if a download request is received and the process actually proceeds to step S402, authentication processing and the like are execute. However, such processing procedures are also omitted herein. In step S602, secondary contents (secondary content reproduction control file) are searched by accessing the secondary content database 22a of the storage unit 22 and the searched secondary content reproduction control file is transmitted to the user terminal apparatus 4 of the requesting source.

The user terminal apparatus 4 which has transmitted the download request in step 502 waits until the secondary content reproduction control file corresponding to the download request is received in step S503. In addition, when it is determined that the secondary content reproduction control file has been received, the received secondary content reproduction control file is stored in an appropriate directory so as to be managed in step S504.

In addition, the processing shown in the drawing corresponds to a case where download of secondary contents based on direct designation of a URL, which is not performed through the site opened to the public 2a and is shown as the procedure 9 in FIG. 2. Moreover, even in the case where a download request is performed by accessing the site opened to the public 2a and selecting predetermined secondary contents, the download request for secondary contents may be regularly performed by applying processing based on that shown in FIG. 19.

Figure 20:
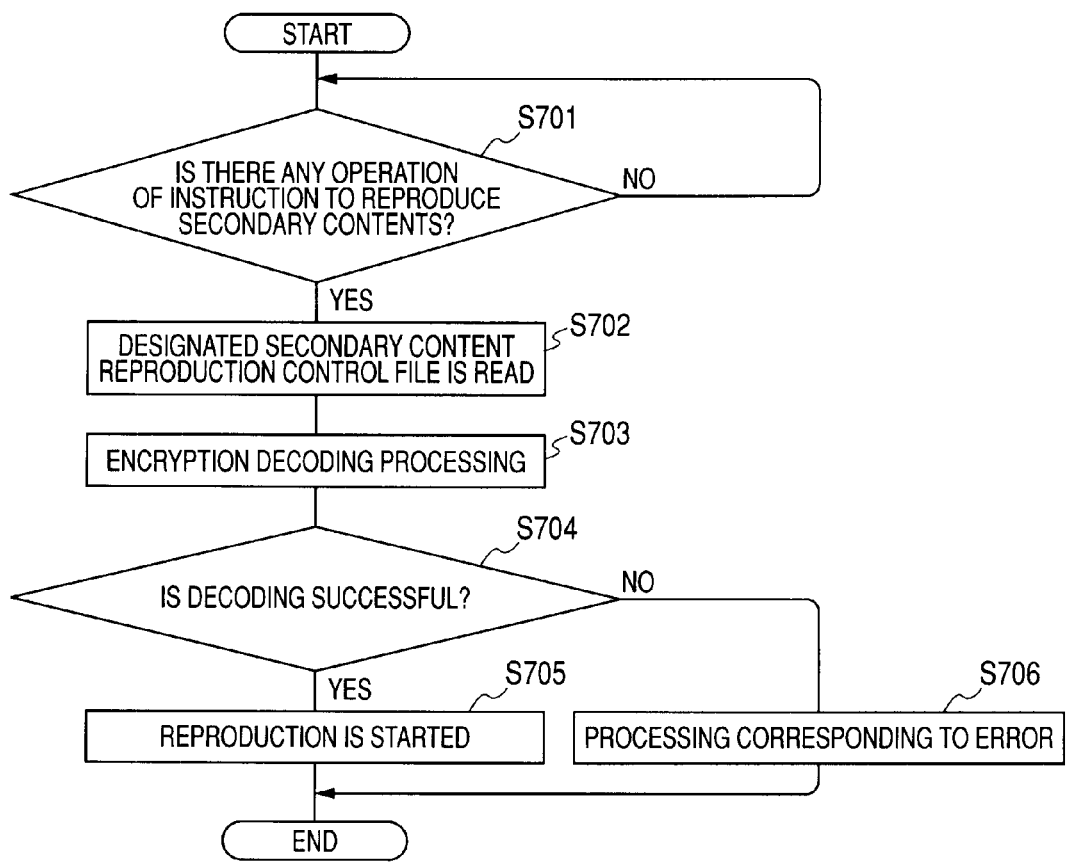
FIG. 20 is a flow chart illustrating an example of processing procedures for reproduction of secondary contents performed by a user terminal apparatus.

A flow chart shown in FIG. 20 illustrates an example of procedures required when the user terminal apparatus 4 reproduces secondary contents acquired (stored in the HDD 48) by download. Processing at a side of the user terminal apparatus 4 in this drawing is realized by a program mainly as the secondary content storage and management processing portion 115, the encoding and decoding processing portion 119, and a sound reproduction signal processing portion.

First, in step S701, the user terminal apparatus 4 waits until an instruction of reproduction start of secondary contents stored in the HDD 48 after the download is obtained. Here, if an instruction to select one secondary content from the secondary contents stored in the HDD 48 and to start reproduction of the secondary contents is performed, for example, as an operation on the GUI realized by the secondary content storage and management processing portion 115, the process proceeds from step S701 to step S702.

In step S702, a secondary content reproduction control file corresponding to the designated secondary contents is read from the HDD 48. Here, the secondary content data acquired by download is stored in the HDD 48 in a condition that encryption at the time of transmission is still applied. Therefore, in step S703, processing for decoding the encryption of the read secondary content data is executed.

In step S704, a determination on whether or not the decoding processing in step S703 has been successful is made. For example, if the secondary content data designated to be reproduced in step S701 has been regularly downloaded from the content server 2, the decoding processing in step S703 becomes successful, and as a result, proper secondary content data is restored. On the other hand, for example, in the case of secondary content data acquired by means other than the download from the secondary content server 2, encryption based on other methods or algorithms are performed or encryption is not performed. In this case, it is difficult to restore normal secondary content data with the decoding processing in step S703 or it is not necessary to execute decoding processing. That is, a result of the decoding processing in step S703 may be considered as failure including a case in which the decoding processing is not required.

In the case where a positive determination result indicating that the decoding processing is successful in step S704 is obtained, the process proceeds to step S705 in which reproduction control processing for the secondary contents is started. In contrast, in the case where a negative determination result indicating that the decoding processing has failed in step S705 is obtained, the process proceeds to step S706 in which processing corresponding to the error is executed. As the processing corresponding to an error, first, reproduction control processing on the secondary contents whose reproduction is designated is not started and, for example, control processing for notifying on the GUI that the secondary contents whose reproduction is designated cannot be reproduced because the secondary contents are not legal. In the present embodiment, for example, by executing such processing, only secondary content information that is legally downloaded and acquired from the secondary content server 2 among secondary content information acquired from the outside is reproduced in the user terminal apparatus 4, such that the copyright of primary contents or the secondary contents is thoroughly protected. In addition, other structures for allowing only secondary contents, which have been legally downloaded from the secondary content server 2, to be reproduced and output may be considered. For example, it may be possible to adopt a configuration in which decoding is performed beforehand in a phase, in which the user terminal apparatus 6 has received and acquire secondary contents by download, the secondary contents are stored in the HDD 48 in a condition where information on the decoding result is added thereto, and a determination on whether to reproduce the secondary contents or not is made referring to the added information on the decoding result. In addition, at the time of transmission from the secondary content server 2, a special code indicating that transmission has been made for download may be written in the secondary contents as processing of the secondary content server 2 such that the user terminal apparatus 4 can determine whether to reproduce the secondary contents or not at the time of reproduction by checking the existence or details of the code.

As described so far, the music editing and sharing system according to the present embodiment is configured to include realize the basic use mode described with reference to FIG. 2, for example. In such a mode, secondary contents created by a user may be shared among other users by opening the secondary contents through the secondary content server 2.

Here, some network services through which contents, such as a still image including a photograph or a video, are opened to the public on a network are known. However, in the case of such services, opening of contents is uniformly unrestricted, and setting change of an opening range in a predetermined number of steps is possible like the SNS or the like. However, since setting of the opening range is common to all contents within a user page, for example, a degree of freedom in setting of an opening mode is not high. Therefore, in the present embodiment, through the configuration to be described below, a high degree of freedom is obtained by further reflecting the intention of a user in setting of an opening mode of secondary contents performed in the secondary content server 2.

In the present embodiment, as a technical configuration for those described above, a configuration in which a functional portion as the managing unit 28 for sites opened to the public is provided in the secondary content server 2 and the database 22b for sites opened to the public is stored in the storage unit 22 such that contents management becomes possible by distinguishing between opening to the public and opening to specific persons as an opening mode of secondary contents is first adopted as shown in FIG. 7. In addition, such secondary content server 2 provides, as information used to manage an opening mode, opening instruction information as one of metadata in a secondary content reproduction control file that is the substantial body of the secondary contents, as described in FIG. 12.

FIG. 21A illustrates an example of the structure of the opening instruction information. Here, as shown in the drawing, the opening instruction information is configured to include information items of an initial opening range, an opening range change type, an opening threshold value access number, a maximum permitted access number, and the number of times of user-unit access permission.

The initial opening range is information indicating which opening range (may also be referred to as an opening mode) is to be set when first opening the current secondary content server 2 to the public by uploading the current secondary contents to the secondary content server 2. In addition, as information contents of the initial opening range, two contents of "opening to the public" and "opening to specific persons" are defined as shown as item numbers 1 and 2 in FIG. 21B. Data indicating anyone of the "opening to the public" and the "opening to specific persons" is stored in information items of the initial opening range. In addition, for clear understanding of explanation, the "opening to the public" indicates opening to the public through the site opened to the public 2a, and the "opening to specific persons" indicates opening in which download is possible only by direct access without performing opening to the public through the open site 2a.

An information item of the opening range change type indicates that a change (opening range change type) of an opening range of which kind of contents has been selected in a case that the initial opening range is "2. Opening to specific persons". As contents of the opening range change type, three contents of "range expansion", "access restriction", and "holding of opening to specific persons" are defined as shown as item numbers 1, 2, and 3 in FIG. 21C. That is, in the present embodiment, in the case where an initial opening range is the "opening to specific persons", any one of three corresponding to the "range expansion", the "access restriction", and the "holding of opening to specific persons" is selected in a subsequent opening mode. The "range expansion" means that opening to specific persons is set initially and then a change to opening to the public is made on a condition that the number of access to current secondary contents reaches a threshold value set beforehand. That is, an opening range expands later from initial opening to specific persons to opening to the public according to the access number. On the contrary, the "access restriction" means restricting access, which is performed for secondary contents, according to the access number from a state of initial opening to specific persons. The access number for the access restriction will be described later as defined contents of information items including the maximum permitted access number and the number of times of user-unit access permission. The "range expansion" and the "access restriction" is used to change an opening range (mode) after an initial stage according to the number of access to current secondary contents. On the other hand, the "holding of opening to specific persons" means that opening to specific persons in the early opening stage is continued (held) regardless of the access number after the start of opening.

In addition, the opening threshold value access number in the opening instruction information shown in FIG. 21A is a data value that becomes effective when data indicating the "range expansion" is stored in an information item of the opening range change type. That is, as described above, the opening threshold value access number indicates the access number becoming a threshold value when a change from a state of opening to specific persons in an early opening stage to the opening to the public is made. In addition, one-time "access" of which the number of times is counted as the opening threshold value access number indicates an operation until access as a download request from the user terminal apparatus 4 is performed and data of secondary contents is properly transmitted to a requesting source in response to the request. Therefore, even if a download request occurs, this is not counted as an access number when the download request is refused for a certain reason. The same is true for the maximum permitted access number, the number of times of user-unit access permission, and the like which will be described later.

In addition, the maximum permitted access number in the opening instruction information is a data value that becomes effective when data indicating the "access restriction" is stored as the opening range change type information. In addition, in one actual restriction mode as the "access restriction", when the number of access to present secondary contents exceeded a threshold value set beforehand, subsequent access to the secondary contents is not permitted. The maximum permitted access number is data indicating a threshold value of the access number in such access restriction. That is, when the number of access to current secondary contents exceeds a value indicated by the maximum permitted access number, subsequent access to the current secondary contents is not permitted. In addition, as for the maximum permitted access number, a concept in which second and subsequent access is not counted or a concept in which second and subsequent access is counted may be adopted in connection with access from the same user. It is preferable to determine one of the concepts depending on an actual condition, such as management of a music editing and sharing application.

Furthermore, as described above, in a mode of the "access restriction", only access up to the maximum permitted access number is permitted and access up to the number of times indicated by a threshold value set beforehand can be permitted for a user who has accessed. The number of times of user-unit access permission in opening instruction information is data indicating a threshold value of the number of times of access permitted for the user who has accessed. In addition, the number of times of user-unit access permission may be an option in the case where the "access restriction" is set. In the case when the number of times of user-unit access permission is defined as an option as described above, an effective value does not necessarily need to be set for the number of times of user-unit access permission. In addition, even in the case of access based on the number of times of user-unit access permission, some more specific operation methods may be considered in combination with the maximum permitted access number. As a management example, it may be considered a management method where in the case when the maximum permitted access number is set on the basis of the concept in which second and subsequent access of the same user is also counted, subsequent access is not permitted if the total number of access reaches the maximum permitted access number even if there is still a margin in the number of times of access permission of the user, but in the case when the maximum permitted access number is set on the basis of the concept in which second and subsequent access of the same user is not counted, access of a user who has accessed once is permitted up to the number of times of user-unit access permission even if the total number of access reaches the maximum permitted access number.

Moreover, contents of the opening instruction information are input by causing a user (user A in FIG. 2), who is a creator, to perform an input operation on an UI (user interface: for example, a GUI screen on which designated contents in an opening mode are input by an operation) for designating an opening condition, which is provided by the music editing and sharing application 100, for every information item shown in FIG. 21A, for example, when creating secondary contents in the procedure 2 shown in FIG. 2. As a result, contents designated by the input operation are reflected on the opening instruction information in the secondary content reproduction control file which is the substantial body of created secondary contents. That is, the opening instruction information includes contents of an opening mode (opening range) in which the intention of a user who is a creator of corresponding secondary contents is reflected.

Figure 22:
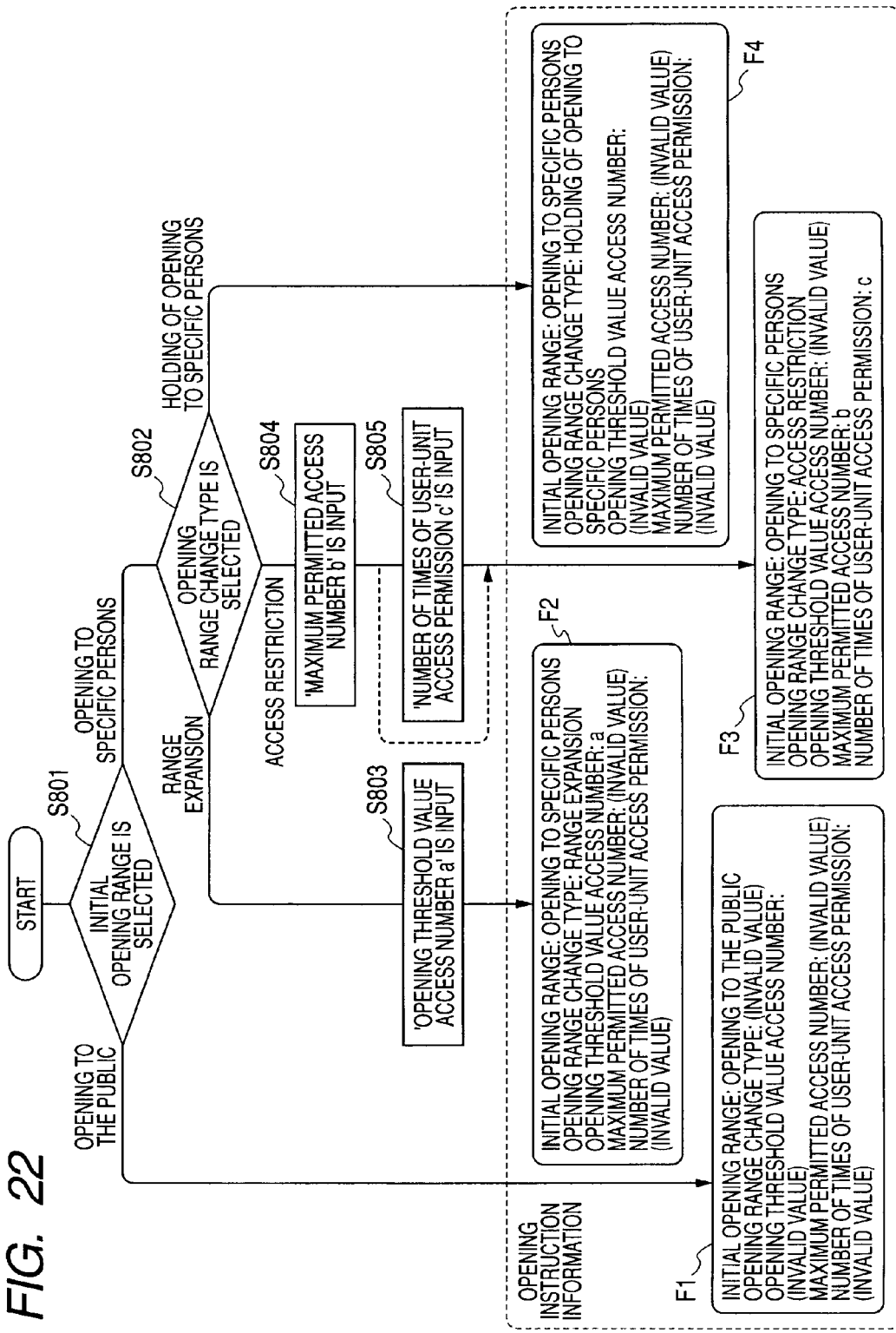
FIG. 22 is a flow chart illustrating an example of input processing procedures for designating information items of opening instruction information for a music editing and sharing application and an example of processing that is executed on the basis of a program of the music editing and sharing application in response to the input operation.

Here, a flow as input operation procedures in the case when a user of the user terminal apparatus 4 designates information items of opening instruction information by an operation on the music editing and sharing application 100 is shown through a flow chart of FIG. 22. In addition, an example of contents as opening instruction information acquired corresponding a result of an input operation is also shown in the drawing. Furthermore, this drawing originally shows work procedures as a user's operation for designating only contents of an information item of opening instruction information. However, a program of the music editing and sharing application 100 may be designed by causing a user interface, which is used to perform input for designating an information item of opening instruction information, to execute processing according to the flow shown in the drawing.

First, as can be understood from the explanation referring to FIGS. 21A to 21C, it becomes a first branch whether an initial setting range is to be the "opening to the public" or the "opening to specific persons" in connection with setting contents regarding an opening mode (opening range). Therefore, even in the operation procedures shown in FIG. 22, either the "opening to the public" or the "opening to specific persons" is first selected in step S801.

In the case when the "opening to the public" is selected as an initial opening range in step S801, data indicating the "opening to the public" is stored in an information item of an initial opening range, as shown as opening instruction information contents F1 in the drawing. In addition, in the case when the initial opening range is set to the "opening to the public", it is not necessary to use a remaining opening range change type, an opening threshold value access number, the maximum permitted access number, and the number of times of user-unit access permission, as can be understood from the above description. Accordingly, for example, data as a predetermined invalid value is stored in the information items.

On the other hand, in the case where the "opening to specific persons" is selected as an initial opening range in step S801, the process proceeds to step S802. As described above in FIGS. 21A to 21C, in the case when the "opening to specific persons" is set as an initial opening range, branch setting regarding the opening mode after the initial stage is performed as an opening range change type. Therefore, in step S802, an opening range selection type is selected.

As an opening range selection type, there are three types of the "range expansion", the "access restriction", and the "opening to specific persons", as described in FIG. 21C. In the case when the "range expansion" is selected in step S802, the process proceeds to step S803. In the case when the "range expansion" is selected, as described in FIG. 21, an opening threshold value access number that is a threshold value related to an access number for making a change from opening to specific persons to opening to the public is set. Then, in step S803, an opening threshold value access number "a" is input. The opening threshold value access number "a" is, for example, a number that a user can arbitrarily select within a number range as a natural number that can be input.

In addition, as a result of having performed the input operation up to step S803, an information item of an initial opening range indicates the "opening to specific persons", an information item of an opening range change type indicates the "range expansion", and an information item of an opening threshold value access number indicates the value "a" input in step S803, as shown as opening instruction information contents F2. In addition, the maximum permitted access number and the number of times of user-unit access permission are not related to this case, invalid values are stored in information items corresponding to the maximum permitted access number and the number of times of user-unit access permission.

In addition, in the case when the "access restriction" is set as an opening range change type, the maximum permitted access number is set as described above in FIG. 21C. Thus, in the case when the "access restriction" is selected in step S802, the maximum permitted access number "b" is set in step S804. Then, a user inputs the number "c" of times of user-unit access permission in step S805. In addition, in the case where setting of the number of times of user-unit access permission is optional, step S805 is skipped of the user does not desire to set the number of times of user-unit access permission. Then, as a result of having performed the input operation up to step S805, an information item of an initial opening range indicates the "opening to specific persons" and an information item of an opening range change type indicates the "access restriction", as shown as opening instruction information contents F3. In addition, an information item of an opening threshold value access number does not need to be used in this case, and accordingly, a special input operation is not performed either. Therefore, an invalid value is shown. On the other hand, a value "b" input in step S804 is shown as an information item of the maximum permitted access number and a value "c" input in step S805 is shown as an information item of the number of times of user-unit access permission. Furthermore, in the case where setting of the number of times of user-unit access permission is optional, an invalid value is stored in an information item of the number of times of user-unit access permission in the opening instruction information F3 if an input operation is finished without setting an effective value of the number of times of user-unit access permission.

Next, in the case when the holding of "opening to specific persons" is selected as an opening change type in step S802, opening instruction information contents F4 are acquired as a result of the input operation up to now. That is, an information item of an initial opening range is made to indicate the "opening to specific persons" and an information item of an opening range change type is made to indicate the "holding of opening to specific persons". In this case, since an opening threshold value access number, the maximum permitted access number, and the number of times of user-unit access permission are not related, invalid values are stored in information items corresponding to the opening threshold value access number, the maximum permitted access number, and the number of times of user-unit access permission.

As described earlier, as the music editing and sharing application 100 (secondary content generation processing portion 117), a GUI for a user's input operation of instructing an opening mode and a program for creating opening instruction information corresponding to an input operation result may be configured corresponding to the flow shown in FIG. 22. That is, for example, when an instruction of calling an opening mode setting screen is first obtained, the music editing and sharing application 100 (secondary content generation processing portion 117) display an operation screen for selecting an initial opening range in step S801. Then, in the case when the "opening to the public" is selected and determined, for example, the opening instruction information contents F1 are created to be stored as opening instruction information in a secondary content reproduction control file. In addition, if the "opening to specific persons" is selected and determined in step S801, a result of setting of the "opening to specific persons" as the initial opening range is held and an operation screen for selecting an opening range change type is displayed in step S802.

If the "range expansion" is selected and determined by an operation on the operation screen for selection of the opening range change type choice in step S802, a result of setting of the "range expansion" as the opening range change type is held and an operation screen for inputting of an opening threshold value access number is displayed in step S803. At this time, a standard value considered that there is a high possibility that a user will generally set is set as an initial value of an opening threshold value access number. Accordingly, for example, a user who thinks that this initial value is sufficient may perform only a determination operation without performing a number input operation. As a result, the user can save time and effort for the operation. In addition, this initial value setting is the same for the maximum permitted access number and the number of times of user-unit access permission in steps S804 and S805 which will be described later. In addition, in the case when a determination operation is performed in a state in which the predetermined opening threshold value access number "a" is set in step S803, the opening instruction information contents F2 are created to be stored as opening instruction information in the secondary content reproduction control file.

In addition, in the case when the "access restriction" is selected and determined in step S802, a result of setting of the "access restriction" as the opening range change type is held and an operation screen for inputting of the maximum permitted access number is displayed in step S804. Then, in the case when a determination operation has been performed in a state in which the predetermined maximum permitted access number "b" is set, the process proceeds to step S805. In step S805, first, an operation screen for setting of the number of times of user-unit access permission is displayed. Here, in the case where a user does not set an effective value for the number of times of user-unit access permission, for example, an operation for making the number of times of user-unit access permission not effective is performed. In addition, in the case of desiring to set the effective number of times of user-unit access permission, an input operation therefore is performed. In addition, in the case when nullification setting for the number of times of user-unit access permission or a determination operation in a state where inputting of an effective value has been performed is performed, the opening instruction information contents F3 are created to be stored as opening instruction information in the secondary content reproduction control file.

In addition, in the case when the holding of "opening to specific persons" is selected and determined in step S802, the instruction information contents F3 are immediately created to be stored as the opening instruction information in the secondary content reproduction control file.

Then, in the procedure 3 shown in FIG. 2, a secondary content reproduction control file in which the opening instruction information generated as described above is stored is uploaded as secondary contents to the secondary content server 2. Thus, the secondary contents uploaded as described above are stored and managed in the secondary content server 2 in the procedure 4 shown in FIG. 2. As the storage and management, registration into the secondary content database 22a is first performed. Moreover, in the present embodiment, the opening mode (opening range) of the secondary contents registered in the secondary content database 22a is managed in such a manner described above. For this reason, the secondary content database 22a is managed in a condition where access history information shown in FIGS. 23A and 23B corresponds to every secondary content.

First, as shown in FIG. 23A, the access history information is configured to include three information items of a corresponding content ID, a total access count, and user access history. As the corresponding content ID, an ID of secondary contents to which current access history information corresponds is shown. In this way, a correspondence between the access history information and the secondary contents is obtained. However, depending on the structure of the secondary content database 22a, for example, an arrangement of information items may be configured such that the correspondence between the access history information and the secondary contents can be uniquely recognized. In the case where such a structure is adopted, the corresponding content ID may be omitted. The total access count is information indicating the number of times of access performed for the corresponding secondary contents. An opening threshold value access number within opening instruction information used in the case where the opening range change type described above is set to the "range expansion" and the maximum permitted access number used in the case where the opening range change type is set to the "access restriction" are compared with the total access count, which will be described later. In addition, even as a concept of the total access count, a concept in which second and subsequent access is not added or a concept in which second and subsequent access is counted may be adopted in connection with access from the same user. In the same manner as the opening threshold value access number described above, one-time "access" counted as the total access count may be considered to indicate an operation until access as a download request from the user terminal apparatus 4 is performed and data of secondary contents is properly transmitted to a requesting source in response to the request. The user access history is information for managing history of access, which is performed for corresponding secondary contents, for every user. For example, as shown in FIG. 23B, the user access history is configured to include an information unit having a user ID and a user unit access count as a pair. A user ID for identifying a user is stored in an information item of a user ID. In the user unit access count, a value indicating the number of times that a user having a corresponding user ID has accessed corresponding secondary contents up to now is stored. In the user access history, an information unit configured to include information items of the user ID and the user unit access count is formed so as to be arrayed for every user who has accessed the corresponding secondary contents up to now. The user unit access count in the user access history is used for comparison with the number of times of user-unit access permission, which will be described later.

Figure 24:
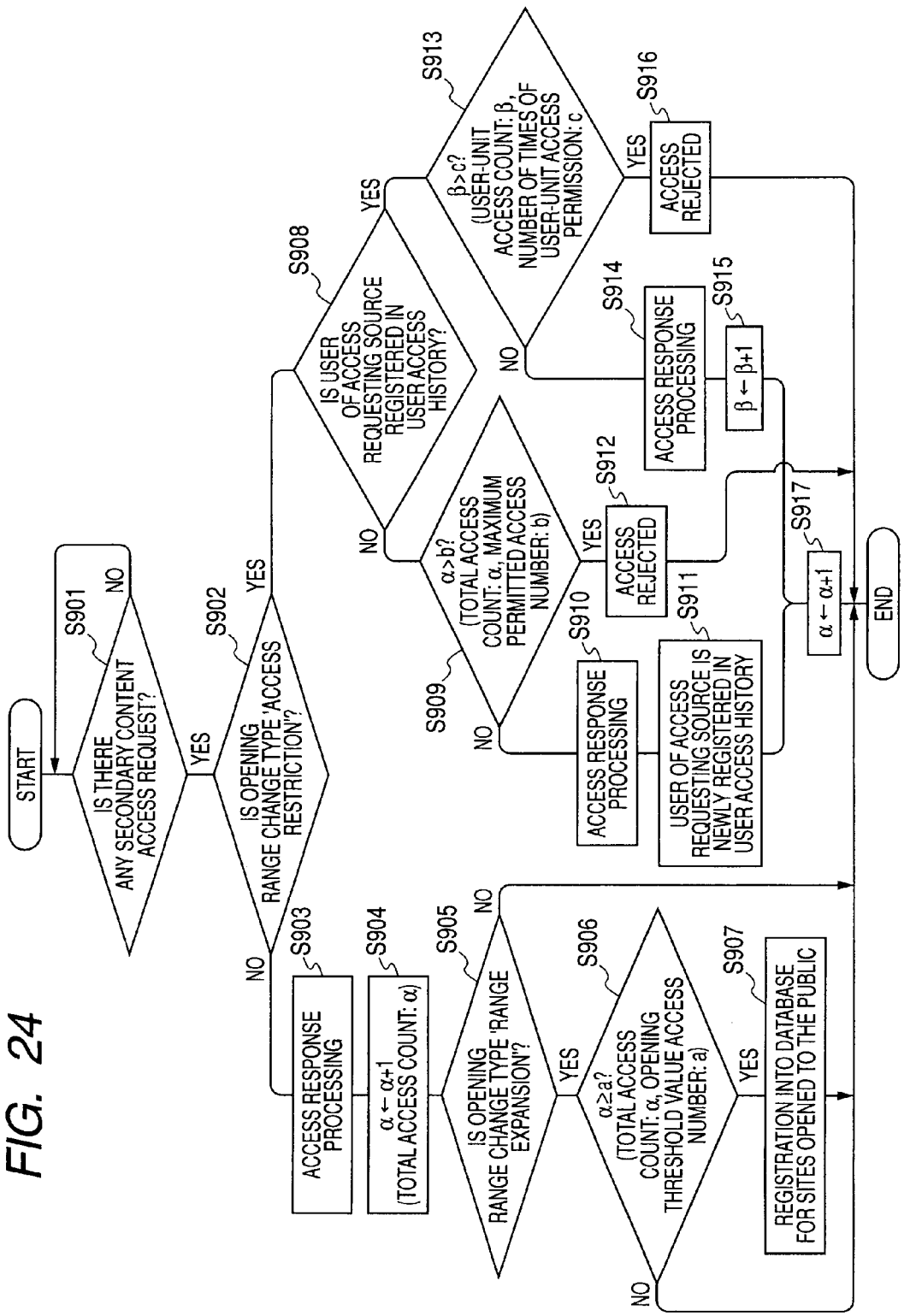
FIG. 24 is a flow chart illustrating an example of processing procedures for setting of an opening range (opening mode) of secondary contents in a secondary content server.

Next, an example of procedures for setting of an opening range (opening mode) of secondary contents in the secondary content server 2 will be described with reference to a flow chart shown in FIG. 24. In addition, the procedures shown in this drawing are processing in the case where the initial opening range is set to the "opening to specific persons". Furthermore, in the procedures shown in this drawing, the open range managing portion 25b in the database managing unit 25 is mainly executed. In addition, a function as the open range managing portion 25b may also be realized when a CPU, which is hardware which forms the secondary content server 2, performs execution according to a program stored in the secondary content database 22a, for example.

In this case, first, the secondary content server 2 waits until an access request, which designates one predetermined secondary content transmitted from a user terminal apparatus 4 through a network, is received in step S901. Then, when it is checked that the access request has been received, the process proceeds to procedures of step S902 and subsequent steps.

In step S902, it is determined whether or not an opening range change type set for secondary contents (targeted secondary contents), for which the current access request has been performed, is the "access restriction". In order to do so, first, contents of an information item of an opening range change type within opening instruction information of the secondary contents (targeted secondary contents) indicated by the content ID are read from the secondary content database 22a referring to the content ID of the targeted secondary contents so as to be recognized. Then, in step S902, a positive determination result is obtained if the read contents indicate the "access restriction" and a negative determination result is obtained if the read contents indicate the "range expansion" or the "opening to specific persons" or if an invalid value is stored.

In the case when the negative determination result is obtained in step S902, the process proceeds to step S903. In step S903, in the case when the negative determination result is obtained in step S902, an opening range change type corresponds to either the "range expansion" or the "holding of opening to specific persons". In connection with the opening range change type, there is no condition of particularly restricting the access. Then, in step S903, control processing (access response processing) for transmitting data of the targeted secondary contents to the user terminal apparatus 4 of a requesting source in response to the current access request. In response to the execution of access response processing as described above, in step S904, access to access history information on the targeted secondary contents in the secondary content database 22a is performed and a value α of total access count stored in the access history information is incremented.

Then, in step S905, it is determined whether or not an opening range change type set for the targeted secondary contents is the "range expansion". First, in the case when the positive determination result that the opening range change type is the "range expansion" is obtained in step S905, the process proceeds to step S906. In step S906, the total access count α after being incremented in step S905 is compared with the opening threshold value access number "a" stored in the secondary content database 22a corresponding to the targeted secondary contents and then it is determined whether or not $\alpha \geqq a$ is satisfied.

In the case when the positive determination result is obtained in step S906, the general access number (total access count α) from the user terminal apparatus 4 up to now has reached the opening threshold value access number "a" set beforehand in connection with the targeted secondary contents. That is, this means that a condition for a change from a state of opening to specific persons to opening to the public is satisfied. Therefore, in this case, the targeted secondary contents are registered in the database 22b for sites opened to the public in step S907. Thus, when the targeted secondary contents are registered in the database 22b for sites opened to the public, the targeted secondary contents are opened to the public in a site opened to the public by processing of the managing unit 28 for sites opened to the public. On the other hand, in the case when a negative determination result is obtained in step S906, a condition for the change from the state of opening to specific persons to the opening to the public is not satisfied yet. Therefore, in this case, escape from the flow of procedures shown in the drawing is made.

In addition, in the case when a negative determination result, which indicates that the opening range change type is not the "range expansion", is obtained in step S905, the opening range change type is uniquely the "holding of opening to specific persons". Even in this case, escape from the flow of procedures shown in the drawing is made.

Furthermore, in the case when the positive determination result, which indicates that the opening range change type is the "access restriction", is obtained in step S902, the process proceeds to step S908. Moreover, in the subsequent description, it is assumed that setting of the number of times of user-unit access permission is not optional but the number of times of user-unit access permission is set as an essential item. In addition, in the case where a user who has once accessed secondary contents, in which the "access restriction" is set as an opening range change type, accesses the same secondary contents again, it is determined whether or not a user of a requesting source who has performed the current access request is registered in user access history (refer to FIGS. 23A and 23B) within access history information in step S908. In order to perform the determination, it is preferable to perform searching for whether or not there is a user ID, which is transmitted together with an access request, matching the user ID registered in the user access history. Then, first, in the case when a negative determination result is obtained in step S908, the process proceeds to step S909. This means that the user, who has performed the current access request, has accessed the targeted secondary contents for the first time in the case when the negative determination result is obtained in step S908.

In step S909, the total access count α in the access history information on the targeted secondary contents is compared with the maximum permitted access number "a" set for the same targeted secondary contents and it is determined whether or not $\alpha < b$ is satisfied. Here, if a negative determination result is obtained, the past access number (total access count) with respect to the targeted secondary contents has not reached the maximum permitted access number yet, and accordingly, access is not still permitted. Therefore, in this case, the process proceeds to step S910 such that the same access response processing as in step S904 is executed.

When the access response processing is completed in step S910, the user who has performed the current access request is newly registered in the user access history in step S911 and then the total access count α is incremented in step S917, such that escape from the processing shown in the drawing is made.

In addition, in the case when the positive determination result is obtained in step S909, the past access number (total access count) with respect to the targeted secondary contents has reached the maximum permitted access number. Accordingly, access to the targeted secondary contents is not permitted. Then, in this case, processing as access rejection is executed in step S912, such that escape from the processing shown in the drawing is made. As the processing for access rejection, notification that transmission of secondary content data is rejected is performed as a response of the current access request. Therefore, in this case, the targeted secondary content data is not transmitted to the requesting source.

In addition, in the case when a positive determination result, which indicates that the user who has performed the access request is already registered in the user access history, is obtained in step S908, the process proceeds to step S913. In step S913, in the user access history of the targeted secondary contents, a user unit access count β corresponding to the user ID of the user (object user), who has performed the current access request, and the number "c" of times of user-unit access permission set in the targeted secondary contents are compared with each other and it is determined whether or not the relationship of $\beta > c$ is satisfied.

In the case when a negative determination result is obtained in step S913, the number of times (user-unit access count) in which the object user has accessed the targeted secondary contents in the past has not reached the number of times of user-unit access permission yet. Accordingly, access of the object user to the targeted secondary contents is still permitted. Therefore, in this case, the process proceeds to step S914 such that the same access response processing as in step S910 is executed. Then, the user unit access count β of the object user is incremented in step S915 and then the total access count α is also incremented in step S917 such that the access history information is updated, and thus escape from the processing shown in the drawing is performed.

In addition, in the case when the positive determination result is obtained in step S913, the number of times in which the object user has accessed the targeted secondary contents in the past reaches the number of times of user-unit access permission. Accordingly, access of the object user to the targeted secondary contents is not permitted. Therefore, in this case, processing as access rejection is executed in step S916, such that escape from the processing shown in the drawing is made.

As can be understood from description up to now, in the present embodiment, first, a user can set an opening mode (opening range) of the secondary content server 2 when creating the secondary contents using the user terminal apparatus 4.

For example, in the case of video contribution sites up to now, it is common that videos are uniformly opened to the public when the contents are uploaded. However, depending on a user, it is expected that there will be not a few cases where contents created by the user are not first opened to the public but only limited users, such as friends or acquaintances, can access (download) the contents so as to appreciate the contents and then a larger number of users can access the so as to appreciate the contents, for example, if evaluation or popularity from the limited users is satisfactory. In addition, a situation where a limited number of users access the secondary contents in a state of opening to specific persons can be obtained when a user who is an creator of the secondary contents performs notification through a CGM, an E-mail, and the like, as shown in the procedures 6, 7, and 8 of FIG. 2. In order to meet such a demand, in the music editing and sharing system according to the present embodiment, opening to specific persons is set in setting an opening mode without initially performing opening through the site opened to the public 2a, and then a change to opening to the public is made if the access number in the state of the opening to specific persons reaches a predetermined value. That is, the "opening to specific persons" is set as an initial opening range, and the "range expansion" is set as an opening range change type. Thus, the opening range expansion described above can be realized. That is, although those who have an interest among users who have received the notice access and appreciate the contents at first, the evaluation is transmitted to the user, who is the creator, through the CGM or an E-mail if the contents are satisfactory. Then, the user desires to notify more people by slightly extending a range of human relation. Then, the number of users, who actually try to download the contents, among those who received the notice increases since the contents are satisfactory. Such conduct leads to an increase in the access number. In addition, since users who received the notice think the content satisfactory after downloading and viewing the contents, it is expected that word-of-mouth transmission, which means notifying other users, will also occur. This also leads to the increase in the access number. It is expected that using the access number for trigger of a change to the opening to the public is very effective since the quality of secondary contents is reflected.

Furthermore, such an opening range change is executed by performing an operation (creation of opening instruction information) of setting an opening mode (opening range) in a phase of creating the secondary contents and is then executed as automatic processing in the secondary content server 2. Accordingly, for example, since it is not necessary for the user to set the opening range after upload, a load of the user is very small. Moreover, here, the access number is used as the trigger of a change from opening to specific persons to opening to the public, and the user can arbitrarily set the access number (that is, an opening threshold value access number). That is, it can also be set according to the intention of a user when a change to opening to the public based on a level of high popularity obtained is to be made.

In addition, while there are users who want to expand an opening range as described above, for example, there should be some users who want opening to the public with confidence from the beginning. To the contrary, there should be some users who want users, such as predetermined limited friends and acquaintances, to view their contents from the beginning. In addition, there should be users who want to stop opening of the content if a predetermined number of persons have viewed the contents. For this reason, in the present embodiment, the "opening to the public" can be set as an initial opening range so as to meet demands of the former users. In addition, "holding of no opening" or "access restriction" is set in a condition that the "opening to specific persons" is set as an initial opening range. In this way, a demand of a user, who does not want to aggressively open secondary contents that the user has created, can also be satisfied. In connection with the "access restriction", a user can arbitrarily set a level of a condition for stopping the opening of secondary contents, which has been created the user, by specifying the maximum permitted access number and the number of times of user-unit access permission. Thus, in the music editing and sharing system according to the present embodiment, the intentions of various kinds of users can also be reflected in connection with an opening mode of contents (secondary contents) that are created by the user. As a result, it can be said that a degree of freedom higher than before is given.

Furthermore, the above-described setting of an opening mode (opening range) of secondary contents is performed when the user performs an input operation in creating secondary contents using the user terminal apparatus 4 (music editing and sharing system 100). That is, an intention of a creator (copyright holder) is reflected by setting of an opening range of the secondary contents. However, as can be understood from description up to now, previous-generation primary contents or secondary contents that already exist are used as editing materials in creating secondary contents. Accordingly, an opening range according to the intention of a copyright is also set in each of the contents of the editing materials. Taking this point into consideration, in the case where an opening range is set completely arbitrarily according to the intention of a user of a creator in newly creating secondary contents, there is a possibility that a result of exceeding the opening range set in contents used as an editing material will come out. If new secondary contents are opened to the public in the secondary content server 2 in a condition that such opening range setting is performed, at least apart of an editing material in the new secondary contents is opened to the public while an opening intention of a creator (copyright holder) of contents used as an editing material of contents of an editing material used for creation of the secondary contents is neglected. Such opening of secondary contents means that the intentions of creators of primary contents and secondary contents are not respected, for example, which is not preferable.

Therefore, in the present embodiment, a predetermined limitation is applied in setting an opening range of secondary contents. Hereinafter, this point will be described. In addition, management of a generation of contents (primary contents and secondary contents) in the music editing and sharing system according to the present embodiment is related to the limitation of the opening range of secondary contents in the present embodiment. Accordingly, first, the generation management using the music editing and sharing system according to the present embodiment will be described.

Figure 25:
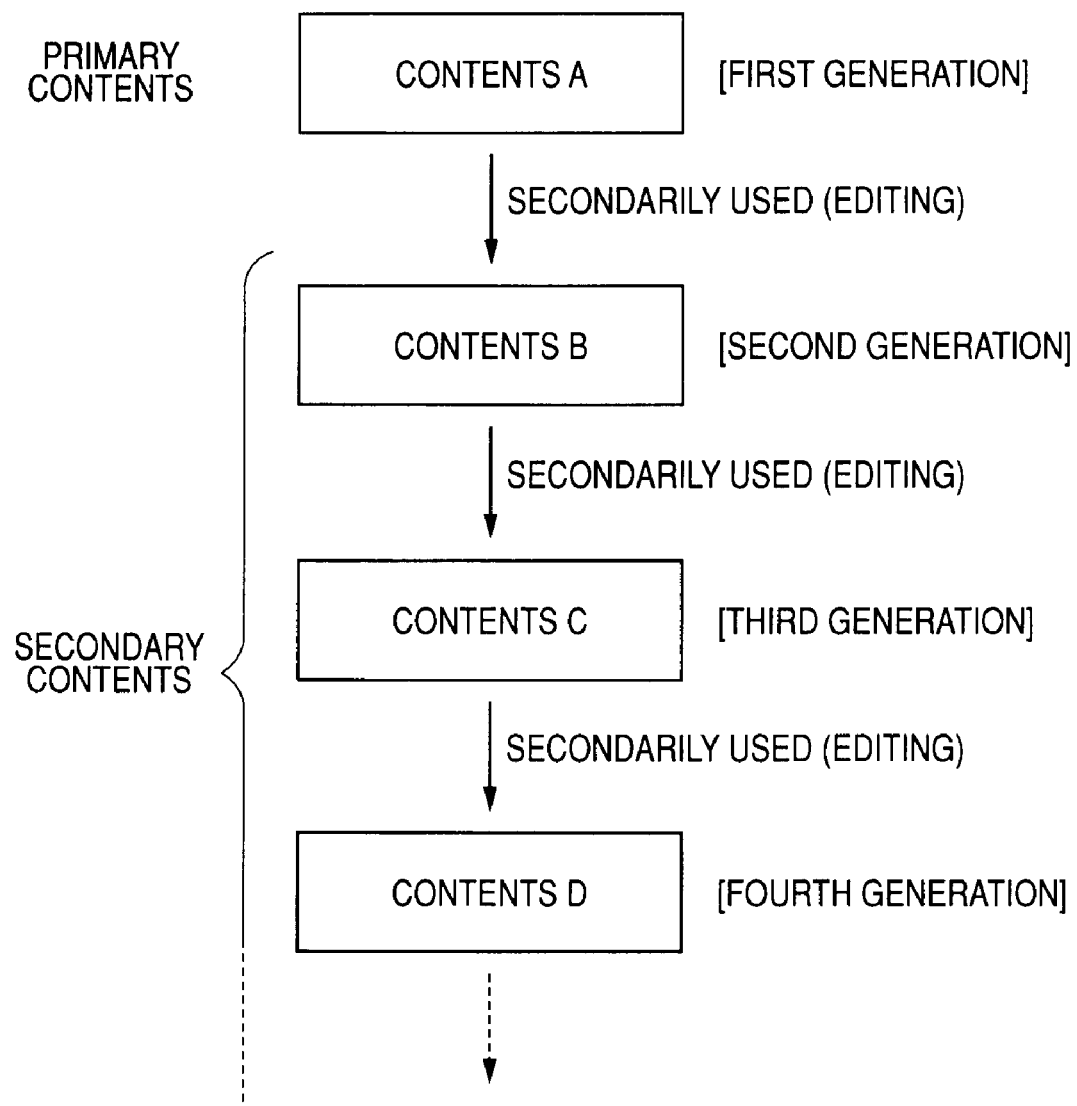
FIG. 25 is a view illustrating an example of a basic rule regarding definition of generation of contents in the music editing and sharing system according to the present embodiment.

FIG. 25 is a view schematically illustrating a basic idea about a generation of contents in the music editing and sharing system according to the present embodiment. In FIG. 25, contents A are first shown as primary contents. In the present embodiment, primary contents are not secondarily created by using editing material contents in the music editing and sharing system according to the present embodiment. That is, primary contents based on contents serving as an origin are defined as first-generation contents. Therefore, the contents A, which are the primary contents, are first-generation contents.

Here, it is assumed that contents B, which are new secondary contents, are created by using the contents A as a direct editing material and performing predetermined editing. Here, the relationship between the new secondary contents and the editing material contents, which are secondarily used directly in order to create the new secondary contents, is assumed to the relationship between a child and a parent. Then, since secondary contents as the contents B are obtained by secondarily using the primary contents belonging to the first generation, the generation is a second generation next to the first generation. Subsequently, in the same manner, contents C, which are secondary contents created by secondarily using the contents B as a direct editing material, belong to a next third generation on the basis of having secondarily used the second-generation contents. Moreover, contents D, which are secondary contents created by secondarily using the contents C as a direct editing material, belong to a next fourth generation on the basis of having secondarily used the third-generation contents. Similarly, whenever next-generation secondary contents are created by secondary use, a variable N when expressed as an N generation is increased by "1".

Figure 26:
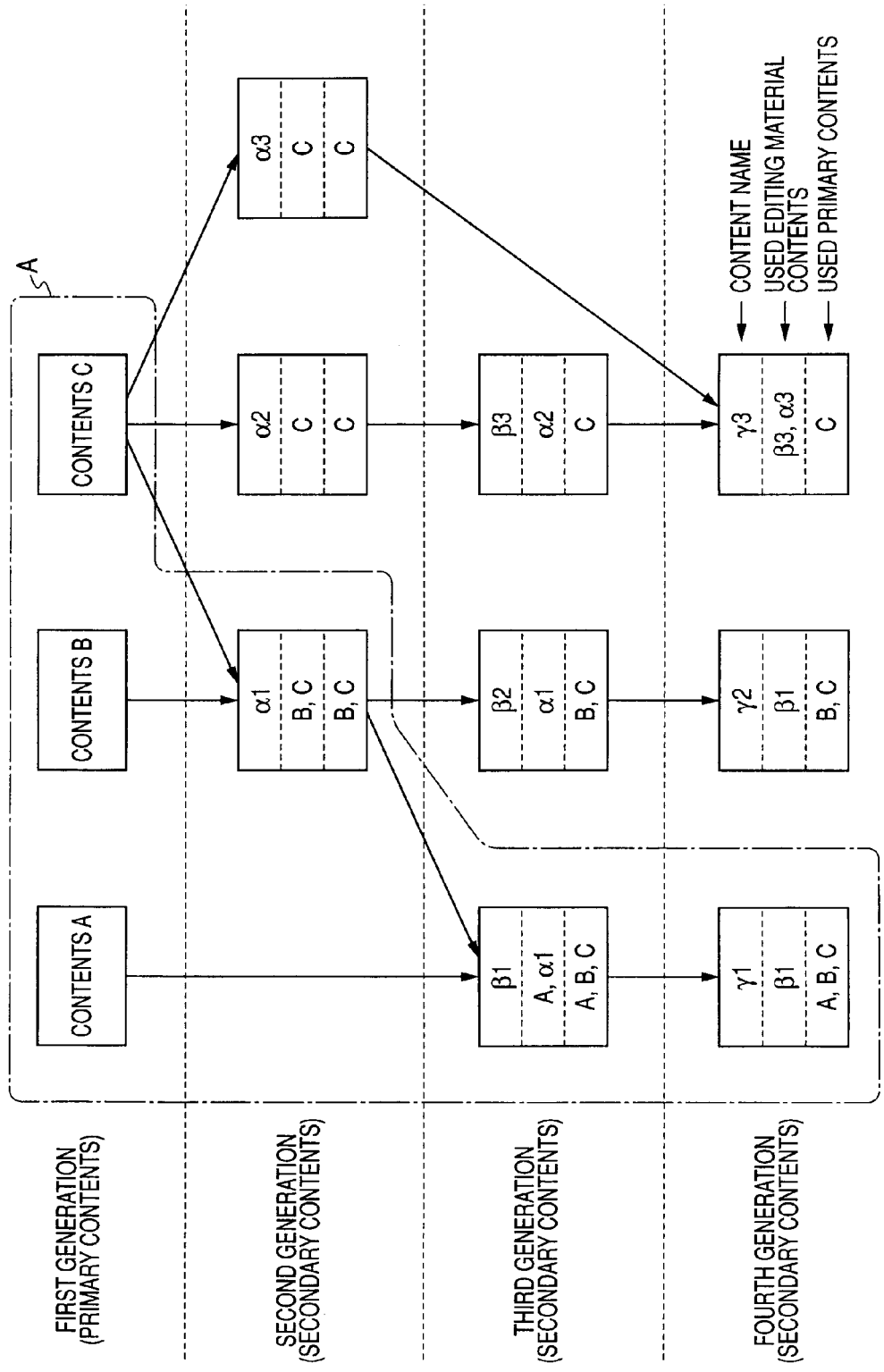
FIG. 26 is a view illustrating an example of a rule regarding definition of generation of secondary contents in the music editing and sharing system according to the present embodiment.

In actuality, secondary contents are created by secondarily using two or more editing material contents in many cases. An example of a rule for generation setting related to new secondary contents in this case is shown in FIG. 26. In addition, in this drawing, three information contents regarding secondary contents corresponding to second and subsequent generations are shown. That is, a content name is shown at the top, details of used editing material contents based on used editing material content information is shown in the middle, and details of used editing material contents based on used primary content information is shown in the bottom.

In this drawing, three contents of contents A, B, and C are shown as first generation contents (that is, primary contents). Then, contents α1 are shown as secondary contents created by secondarily using the contents B and C. Although the contents α1 use the contents B and C as editing material contents (parent contents), both the contents B and C are primary contents and belong to the first generation. Accordingly, the contents α1 belong to a second generation which is a generation next to the first generation. Therefore, contents indicating the second generation are stored in content generation information in a secondary content reproduction control file as the contents α1. In addition, when secondary contents as the contents α1 are created, the music editing and sharing application 100 generates contents of used editing material content information so as to indicate that the editing material contents are the contents B and C and generates contents of used primary content information so as to indicate that primary contents (used primary contents) as original editing materials are the contents B and C. In addition, contents α2 are secondary contents created by secondarily using only the contents C as an editing material. Since the contents C belong to the first generation (primary contents), the contents α2 is set as the second generation. Similarly, contents α3 are also secondary contents created by using only the contents C as an editing material. Accordingly, the contents α3 are set as the second generation. In both cases of the contents α2 and α3, contents of used editing material content information are generated so as to indicate that the editing material contents are only the contents C and contents of used primary content information are generated so as to indicate that used primary contents are also only the contents C.

Next, contents β1 are secondary contents created by secondarily using the contents A and the contents α1 as editing materials. Here, the contents A belong to the first generation, while the contents α1 belong to the second generation. When both contents are compared, a generation of the contents α1 is a late generation. Therefore, the contents β1 are set as a third generation, which is a generation subsequent to the generation of the contents α1. That is, in the present embodiment, in the case of secondary contents created by using a plurality of editing material contents having different generations, a next generation of a latest generation among editing material contents is set as a generation of secondary contents that are newly created. In addition, as for used editing material content information of the contents β1, the contents are generated so as to indicate that editing material contents are the contents A and α1. Since used primary contents of the contents α1 are the contents B and C, it is recognized that the contents β1 use the contents A, B, and C as primary contents that are original editing materials. Therefore, contents of used primary content information are generated so as to indicate that the used primary contents are three of the contents A, B, and C.

In addition, since contents β2 are secondary contents created by secondarily using only the contents α1, which belong to the second generation, as editing material contents, the contents β2 are set as a third generation. Since contents β3 are also secondary contents created by secondarily using only the contents α2, which belong to the second generation, as editing material contents, the contents β3 are set as a third generation. Contents of used editing material content information of the contents β2 are generated so as to indicate that the editing material contents are only the contents α1, and contents of used primary content information are generated so as to indicate that the used primary contents are the contents B and C while reflecting contents of the contents α1. Contents of used editing material content information of the contents β3 are generated so as to indicate that the editing material contents are only the contents α2, and contents of used primary content information are generated so as to indicate that the used primary contents are only the contents C while reflecting contents of the contents α2.

Since contents γ1 are secondary contents created by secondarily using only the contents β1, which belong to the third generation, as editing material contents, the contents γ1 are set as a fourth generation. Accordingly, contents of used editing material content information of the contents γ1 are generated so as to indicate that the editing material contents are only the contents β1, and contents of used primary content information are generated so as to indicate that the used primary contents are the contents A, B, and C while reflecting contents of the contents β1. In addition, since contents γ2 are secondary contents created by secondarily using only the contents β2, which belong to the third generation, as editing material contents, the contents γ2 are set as a fourth generation. Contents of used editing material content information of the contents γ2 are generated so as to indicate that the editing material contents are only the contents β2, and contents of used primary content information are generated so as to indicate that the used primary contents are the contents B and C while reflecting contents of the contents β2. In addition, since contents γ3 are secondary contents created by secondarily using the contents β3, which belong to the third generation, and the contents α3, which belong to the second generation, as editing material contents. Accordingly, the contents γ3 in this case are set as a fourth generation subsequent to the third generation, which is the latest generation of the editing material contents, on the basis of a rule of previous generation definition. Contents of the used editing material content information of the contents γ3 are generated so as to indicate that the editing material contents are contents β3 and α3. Contents of used primary content information are generated so as to indicate that the used primary contents are only the contents C. In both cases of the contents β3 and α3, for example, editing results thereof are different but only the contents C are used as an original editing material.

Here, the contents γ1 which are set as the fourth generation are focused in FIG. 26. For example, in a secondary content reproduction control file, information on parent contents (editing material contents) that are secondarily used directly in order to create the secondary content reproduction control file are described in editing material content information. However, in the case of the contents γ1, the editing material content information shows that editing material contents are only the contents β1. Then, referring to the editing material contents for the contents β1, it can be seen that editing material contents used to create the contents β1 are the contents A and the contents α1. Here, the contents A of the contents A and the contents α1, which are editing material contents of the contents β1, are primary contents and belong to the first generation. Therefore, referring to the used editing material content information of the contents α1 which are secondary contents, it can be seen that the contents α1 secondarily use the contents B and C as editing material contents. Both the contents B and C are primary contents and belong to the first generation. In the flow up to now, a family tree of generations of used contents until the contents γ1 are obtained is searched while tracing back to the first generation with the contents γ1 as a starting point. As a result, a family tree in a generation range A that is collectively indicated by a dashed-dotted line in FIG. 26 is recognized. That is, referring to FIG. 26, if editing material contents and secondary contents obtained by secondarily using the editing material contents are assumed to be a parent and a child, the relationship between a parent and a child belonging to previous generations with the contents γ1 as a starting point is clearly recognized. Thus, in the present embodiment, information (used editing material content information) indicating which kind of contents the editing material contents are is added to every secondary contents. Accordingly, a family tree until reaching one predetermined secondary content can be recognized (generation recognition) by tracing back to a previous generation on the basis of the information.

Figure 27:
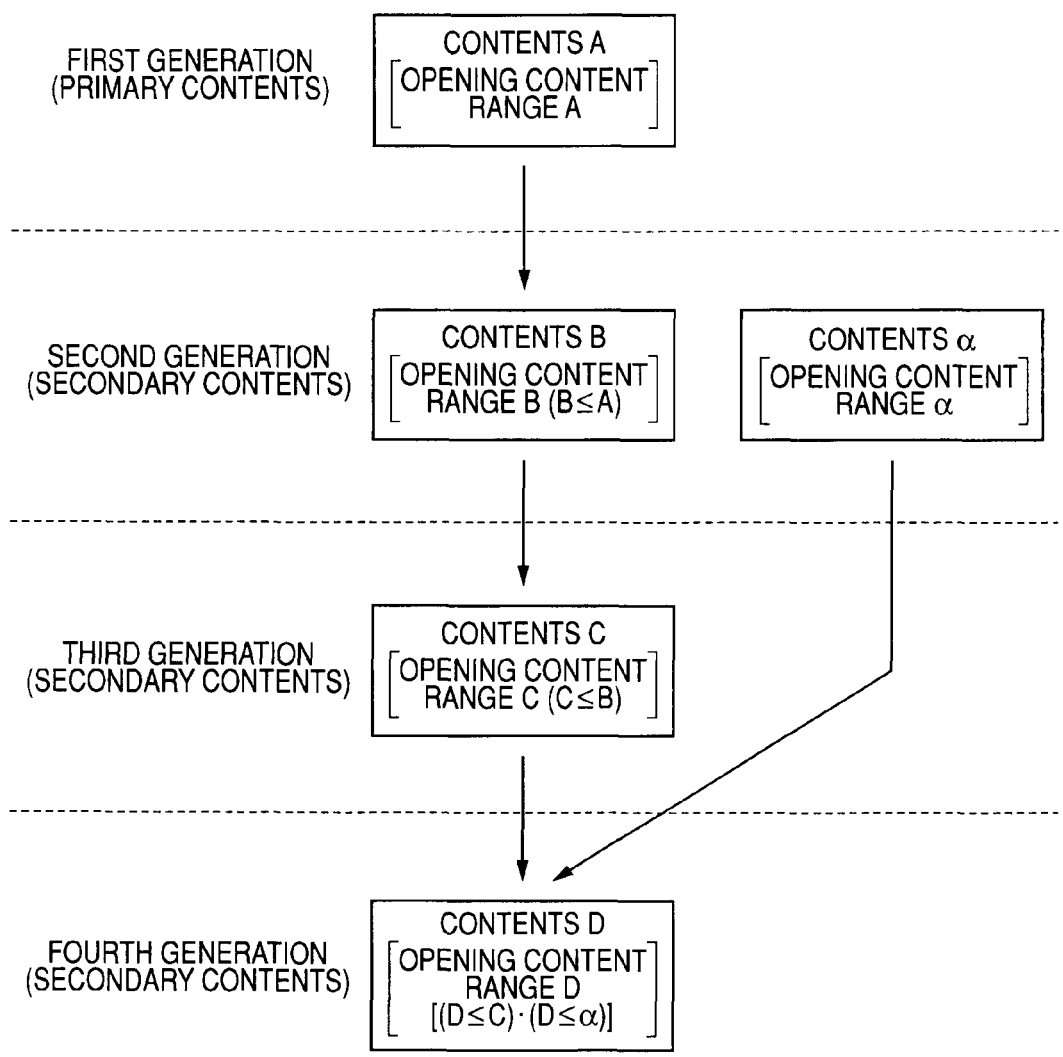
FIG. 27 is a view illustrating an example of a restriction rule regarding setting of an opening range (open content range) in connection with a generation of contents.

Furthermore, in a condition where such management of a generation is performed, setting of an opening range of secondary contents is restricted as follows. For example, as shown in FIG. 27, first, the contents A exist as primary contents belonging to the first generation, and an open content range set in the contents A is assumed to be an open content range A. The set open content range A indicates a range of a predetermined opening mode determined on the basis of contents of opening instruction information acquired according to setting procedures described earlier in FIG. 22.

Next, for example, it is assumed that the contents B, which are secondary contents belonging to the second generation, are created by secondarily using only the contents A as direct editing material contents. In addition, as an open content range B set in the secondary contents B, the open content range B is set so as not to exceed the open content range A of the contents A, that is, so as to satisfy a condition of B≦A if the relationship is expressed in the expression.

A specific example of size relationship setting of every designation item (information item of opening instruction information) in such an open content range and an example of setting the open content ranges A and B corresponding to the example of size relationship setting will be described. Referring to FIG. 22, in connection with branching on a top hierarchy in opening range setting, there are the "opening to the public" and the "opening to specific persons" as initial opening ranges. In the present embodiment, being opened to more users is regarded as expansion of an open content range. For this reason, an initial opening range is defined such that the size relationship of "opening to the public">"opening to specific persons" is satisfied. Accordingly, for example, if the "opening to the public" is set as an initial opening range in connection with the actual open content range A of the contents A, any one of the same "opening to the public" and the "opening to specific persons" of which a range is narrower (smaller) than that of the "opening to the public" can be set as the open content range B of the contents B. To the contrary, if the open content range A is the "opening to specific persons", the "opening to the public" of which a range is larger than that of the "opening to specific persons" cannot be set as the open content range B of the contents B but only the same "opening to specific persons" can be set as the open content range B of the contents B.

In addition, in the case where the "opening to specific persons" is set as an initial opening range, in the next hierarchy, branching into the "range expansion", the "access restriction", and the "holding of opening to specific persons" is made as an opening range change type in a next hierarchy. Such size relationship is defined as "range expansion">"holding of opening to specific persons">"access restriction". Here, it is regarded that an open content range in the "holding of opening to specific persons" is larger than that in the "access restriction". However, while a period of time for which direct access is permitted permanently is limited irrespective of an access number in the case of the "holding of opening to specific persons", subsequent access is not permitted if the access number reaches a predetermined number in the case of the "access restriction". In the case when the "range expansion" is set as an opening range change type in the open content range A of the contents A, any one of the "range expansion", the "access restriction", and the "holding of opening to specific persons" may be set in the open content range B of the contents B. Furthermore, in the case when the "access restriction" is set in the open content range A, setting of the "range expansion" as the open content range B is not permitted but setting of any one of the "access restriction" and the "holding of opening to specific persons" is permitted. Furthermore, in the case when the "holding of opening to specific persons" is set in the open content range A, setting of the "range expansion" and the "access restriction" as the open content range B is not permitted but setting of only the "holding of opening to specific persons" is permitted.

In addition, in the case when the "range expansion" is set as an opening range change type, the opening threshold value access number "a" is set. A condition for shifting from opening to specific persons to opening to the public becomes strict as the opening threshold value access number "a" increases. Therefore, it is defined that an open content range increases as the opening threshold value access number "a" decreases. Accordingly, assuming that an opening threshold value access number a1 is set as the open content range A of the contents A, in the case of setting an opening threshold value access number a2 as the open content range B of the contents B, number setting in a range of a1≦a2 is restricted.

In addition, in the case when "access" is set as the opening range change type, the maximum permitted access number "b" is first set. For the maximum permitted access number "b", it can be recognized that as the maximum permitted access number "b" increases, a degree of restriction decreases, that is, an opening range becomes wide. Accordingly, assuming that a maximum permitted access number "b1" is set as the open content range A of the contents A, in the case of setting a maximum permitted access number "b2" as the open content range B of the contents B, number setting in a range of b1≧b2 is restricted. In addition, even for the number of times "c" of user-unit access permission in a condition that "access" is set as an opening range change type, a degree of restriction decreases, that is, an opening range becomes wide as the number of times "c" of user-unit access permission increases. Accordingly, assuming that the number of times "c1" of user-unit access permission is set as the open content range A of the contents A, in the case of setting the number of times "c2" of user-unit access permission as the open content range B of the contents B, number setting in a range of $c1 \geqq c2$ is restricted. For example, an open content range of secondary contents (that is, contents of opening instruction information) is arbitrarily set in a restriction condition that an open content range set in parent contents is not exceeded as described above.

In addition, FIG. 27 illustrates a case where the contents C, which are secondary contents belonging to the third generation, are created by secondarily using the contents B. An open content range C of the secondary contents C is arbitrarily set in a range not exceeding the open content range B of the contents B as expressed by $C \leqq B$.

Moreover, in FIG. 27, a case where contents D are created by secondarily using two kinds of contents including the third-generation contents C as parent contents and the second-generation contents α is shown. In this case, an open content range (C·α) which is AND operation between the open content range C of the contents C and the open content range α of the contents α is first calculated. The open content range (C·α) is an open content range set so as not to exceed both the ranges of the open content range C and the open content range α. In addition, the open content range D is arbitrarily set in a range not exceeding the open content range (C·α) as expressed by $D \leqq (C \cdot \alpha)$.

The restriction in setting an opening range (open content range) of secondary contents is performed by the music editing and sharing application 100. That is, for example, when the music editing and sharing application 100 (secondary content generation processing portion 117) executes processing for setting of an opening range of secondary contents based on FIG. 22, opening instruction information added to editing material contents (parent contents) that are secondarily used directly is read so that an opening range permitted for the secondary contents created this time is recognized. Then, corresponding to the recognition result, for example, a GUI used for an input operation on each instruction item corresponding to each processing of step S801 to S805 of FIG. 22 is formed such that number input or selection of an item exceeding an opening range permitted is not performed. More specifically, for example, in the case of a GUI on which one selection item is selected from a plurality of selection items, such as an initial opening range or an opening range change type, only an item whose selection is permitted is displayed active so that the item can be selected and items whose selection is not permitted is displayed inactive so that the items cannot be selected. In addition, in the case of a GUI on which numbers, such as the opening threshold value access number "a", the maximum permitted access number "b", and the number of times "c" of user-unit access permission, the GUI is formed such that numbers other than a permitted range cannot be input. For example, if a number other than the permitted range is input, a warning dialog or the like is displayed and a suitable number within a permitted range is urged to be input again.

Furthermore, selection of an opening range and an opening mode of secondary contents and definition of opening instruction information corresponding to the above selection in the music editing and sharing system are not limited to those described until now, but other methods may also be considered. In addition, the size relationship setting of definition contents in every item of opening instruction information used in the above description with reference to FIG. 27 is only an example as already described earlier, and the other methods may also be considered. For example, as opening instruction information, optional instruction contents indicating that a range may be expanded in a late generation may be included in contents of a predetermined information item. In addition, corresponding to a change of an information item that actually forms opening instruction information, the size relation setting for the definition contents needs to be appropriately changed.

In addition, a structure of secondary content data (secondary content reproduction control file) or data of a primary content file may be appropriately changed.

In addition, although digital audio data is set as a main body of primary contents, for example, data having the same data format as secondary contents in a phase of primary contents may also be used. That is, as primary contents, a producer first creates sound sources as some digital audio data, performs editing processing by treating each of the sound sources as editing material contents, and creates a reproduction control file equivalent to a secondary content reproduction control file as the editing result. Then, a file obtained by making the reproduction control file and the digital audio data as the sound sources in a package becomes the primary contents. In this case, data for reproducing substantial contents as the primary contents becomes data of the reproduction control file.

In addition, in description up to now, a specific example of a GUI screen as the music editing and sharing application 100 is not shown, but the GUI configuration of the music editing and sharing application 100 may be considered in various ways.

In addition, the configurations of the primary content server 1, the secondary content server 2, the communication server 3, and the user terminal apparatus 4 shown in FIGS. 6 to 9 are only examples and may be appropriately changed in actuality. In addition, at least one of the three servers may be distributed in a plurality of servers. To the contrary, at least two of three servers may be unified. In addition, the functional configuration of the music editing and sharing application 100 is not limited to those described with reference to FIGS. 10 and 11 and the like, but may be considered in various ways. In addition, the structure of a secondary content reproduction control file shown in FIGS. 12, 13, and 14 is only an example and is conceptual. Accordingly, the structure may be appropriately changed or extended on the basis of those described above. In addition, the processing procedures shown as the flow charts in FIGS. 16 to 19, 23, and 24 and the like, that is, the program configuration is only an example and may be appropriately changed in actuality.

Furthermore, in description up to now, contents reproduced by using primary content data and secondary content data are audio contents, such as a song. However, the contents reproduced by using primary content data and secondary content data may also be video contents including image and sound as a video. In this case, data (body information) used in reproducing substantial contents as primary contents is video signal data (and audio signal data reproduced in synchronization with the video signal). In addition, application to contents of a still image, such as a photograph or an image, may also be made.

It should be understood by those skilled in the art that various modifications, combinations, sub-combinations and alterations may occur depending on design requirements and other factors insofar as they are within the scope of the appended claims or the equivalents thereof.

What is claimed is:

1. A method comprising:

executing a communication through a network;

setting an opening mode that indicates that content information uploaded to a server apparatus on the network is not open to the public, but changes to be open to the public when a number of times the content information is accessed reaches a predetermined number, according to an input operation;

creating the content information, which includes information used to reproduce a content file and opening instruction information indicating the opening mode for the content information set by the setting; and transmitting the content information, which has been created by the creating, to the server apparatus, which executes opening of the content information based on the opening instruction information indicating the opening mode, by communication through the network.

2. The method of claim 1, wherein the information used to reproduce the content file included in the content information includes information used to modify a primary content file and to reproduce the modified primary content file.

3. A method comprising:

executing a communication through a network;

storing content information including an opening instruction information, said opening instruction information indicating that the content information is not open to the public, but changes to be open to the public when a number of times the content information is accessed reaches a predetermined number, said content information being created according to an input operation from a terminal apparatus side that transmits the content information to a server apparatus;

executing processing in response to access from a terminal apparatus for downloading content information, which is stored by storing, through the network; and determining an opening mode of the content information on a basis of the opening instruction information included in the content information.

4. The method of claim 3, wherein the content information includes information used to modify a primary content file and to reproduce the modified primary content file.

5. An information processing system configured to include at least a server apparatus and a terminal apparatus communicable with each other through a network, comprising:

means for setting an opening mode that indicates that content information uploaded to the server apparatus on the network is not open to the public, but changes to be open to the public when a number of times the content information is accessed reaches a predetermined number, according to an input operation in the terminal apparatus;

means for creating the content information, which includes information used to reproduce a content file and opening instruction information indicating the opening mode for the content information set by the means for setting the opening mode;

means for storing the content information in the open server apparatus;

means for transmitting the content information, which has been created by the means for creating, from the terminal apparatus to the server apparatus by communication through the network so as to store the content information in the means for storing; and means for determining an opening mode of the content information stored in the content information storing means on a basis of the opening instruction information of the content information stored in the server apparatus.

6. The information processing system of claim 5, wherein the information used to reproduce the content file included in the content information includes information used to modify a primary content file and to reproduce the modified primary content file.

7. An information processing apparatus comprising:

means for executing a communication through a network;

means for setting an opening mode that indicates that content information uploaded to a server apparatus on the network is not open to the public, but changes to be open to the public when a number of times the content information is accessed reaches a predetermined number, according to an input operation;

means for creating the content information, which includes information used to reproduce a content file and opening instruction information indicating the opening mode for the content information set by the means for setting the opening mode; and means for transmitting the content information, which has been created by the means for creating, to the server apparatus, which executes opening of the content information based on the opening instruction information indicating the opening mode, by communication through the network.

8. The information processing apparatus of claim 7, wherein the information used to reproduce the content file included in the content information includes information used to modify a primary content file and to reproduce the modified primary content file.

9. The information processing apparatus according to claim 7, further comprising:

an editing processing means for creating new contents by executing editing processing by secondarily using data of one or more contents, wherein the means for setting determines a range of an opening mode, which can be set for the new contents, on a basis of the opening instruction information included in information of contents secondarily used by the editing processing means.

10. The information processing apparatus according to claim 9, wherein the means for setting determines a range of an opening mode, which can be set for the new contents, so as not to exceed a range of an opening mode obtained on a basis of the opening instruction information included in contents secondarily used by the editing processing means.

11. A server apparatus comprising:

means for executing a communication through a network;

means for storing content information including an opening instruction information, said opening instruction information indicating that the content information is not open to the public, but changes to be open to the public when a number of times the content information is accessed reaches a predetermined number, said content information being created according to an input operation from a terminal apparatus side that transmits the content information to the server apparatus;

means for executing processing in response to access from a terminal apparatus for downloading content information, which is stored in the means for storing, through the network; and means for determining an opening mode of the content information stored in the means for storing on a basis of the opening instruction information included in the content information.

12. The server apparatus according to claim 11, further comprising:
   means for generating and storing access history information that is information of predetermined contents regarding history of access from the terminal apparatus for every content information stored in the means for storing,
   wherein the means for determining determines an opening mode of at least one content information on a basis of the opening instruction information in the at least one content information and contents of the access history information.

13. The server apparatus of claim 11, wherein the content information includes information used to modify a primary content file and to reproduce the modified primary content file.

14. An information processing system configured to include at least a server apparatus and a terminal apparatus communicable with each other through a network, comprising:
   an opening mode setting section that sets an opening mode that indicates that content information uploaded to the server apparatus on the network is not open to the public, but changes to be open to the public when a number of times the content information is accessed reaches a predetermined number, according to an input operation in the terminal apparatus;
   a transmitted content information creating section that creates content information, which includes information used to reproduce a content file and opening instruction information indicating the opening mode for the content information set by the opening mode setting section;
   a content information section that stores the content information in the open server apparatus;
   a content information upload control section that transmits the content information, which has been created by the transmitted content information creating section, from the terminal apparatus to the server apparatus by communication through the network so as to store the content information in the content information storing section; and
   an opening mode determining section that determines an opening mode of the content information stored in the content information storing section on a basis of the opening instruction information of the content information in the server apparatus.

15. The information processing system of claim 14, wherein the information used to reproduce the content file included in the content information includes information used to modify a primary content file and to reproduce the modified primary content file.

16. An information processing apparatus comprising:
   a communication section that executes a communication through a network;
   an opening mode setting section that sets an opening mode that indicates that content information uploaded to a server apparatus on the network is not open to the public, but changes to be open to the public when a number of times the content information is accessed reaches a predetermined number, according to an input operation;
   a transmitted content information creating section that creates the content information, which includes information used to reproduce a content file and opening instruction information indicating the opening mode for the content information set by the opening mode setting section; and
   a content information upload control section that transmits content information, which has been created by the transmitted content information creating section, to the server apparatus, which executes opening of the content information based on the opening instruction information indicating the opening mode, by communication through the network.

17. The information processing apparatus of claim 16, wherein the information used to reproduce the content file included in the content information includes information used to modify a primary content file and to reproduce the modified primary content file.

18. A server apparatus comprising:
   a communication section that executes a communication through a network;
   a content information storing section that stores content information including an opening instruction information, said opening instruction information indicating that the content information is not open to the public, but changes to be open to the public when a number of times the content information is accessed reaches a predetermined number, said content information being created according to an input operation from a terminal apparatus side that transmits the content information to the server apparatus;
   a download response processing section that executes processing in response to access from a terminal apparatus for downloading content information, which is stored in the content information storing section, through the network; and
   an opening mode determining section that determines an opening mode of the content information stored in the content information storing section on a basis of the opening instruction information included in the content information.

19. The server apparatus of claim 18, wherein the content information includes information used to modify a primary content file and to reproduce the modified primary content file.

20. A non-transitory computer readable storage medium encoded with instructions, which when executed by a computer cause the computer to implement a method comprising:
   executing a communication through a network;
   setting an opening mode that indicates that content information uploaded to a server apparatus on the network is not open to the public, but changes to be open to the public when a number of times the content information is accessed reaches a predetermined number, according to an input operation;
   creating the content information, which includes information used to reproduce a content file and opening instruction information indicating the opening mode for the content information set by the setting; and
   transmitting the content information, which has been created by the creating, to the server apparatus, which executes opening of the content information based on the opening instruction information indicating the opening mode, by communication through the network.

21. A non-transitory computer readable storage medium encoded with instructions, which when executed by a computer cause the computer to implement a method comprising:

executing a communication through a network;

storing content information including an opening instruction information, said opening instruction information indicating that the content information is not open to the public, but changes to be open to the public when a number of times the content information is accessed reaches a predetermined number, said content information being created according to an input operation from a terminal apparatus side that transmits the content information to a server apparatus;

executing processing in response to access from a terminal apparatus for downloading content information, which is stored by storing, through the network; and determining an opening mode of the content information on a basis of the opening instruction information included in the content information.

* * * * *